US012619652B2

(12) United States Patent
Portisch et al.

(10) Patent No.: US 12,619,652 B2
(45) Date of Patent: May 5, 2026

(54) AUTOMATED ONTOLOGY CREATION

(71) Applicant: SAP SE, Walldorf (DE)

(72) Inventors: Jan Portisch, Bruchsal (DE); Sandra Bracholdt, Deilheim (DE)

(73) Assignee: SAP SE, Walldorf (DE)

( * ) Notice: Subject to any disclaimer, the term of this patent is extended or adjusted under 35 U.S.C. 154(b) by 242 days.

(21) Appl. No.: 18/382,992

(22) Filed: Oct. 23, 2023

(65) Prior Publication Data

US 2025/0131031 A1     Apr. 24, 2025

(51) Int. Cl.
*G06F 16/36*     (2019.01)
*G06F 16/901*     (2019.01)

(52) U.S. Cl.
CPC ........ *G06F 16/367* (2019.01); *G06F 16/9024* (2019.01)

(58) Field of Classification Search
CPC ........................... G06F 16/367; G06F 16/9024
USPC .......................................................... 707/736
See application file for complete search history.

(56) References Cited

U.S. PATENT DOCUMENTS

| | | | |
|---|---|---|---|
| 2005/0203943 A1 | 9/2005 | Su et al. | |
| 2008/0222562 A1* | 9/2008 | Helfman | G06F 16/957 |
| | | | 715/810 |
| 2010/0030552 A1* | 2/2010 | Chen | G06F 16/367 |
| | | | 704/9 |
| 2013/0166480 A1* | 6/2013 | Popescu | G06N 20/00 |
| | | | 706/12 |
| 2013/0212111 A1 | 8/2013 | Chaschchin et al. | |

| | | | |
|---|---|---|---|
| 2015/0046779 A1* | 2/2015 | Akselrod | G06F 40/169 |
| | | | 715/202 |
| 2018/0107760 A1* | 4/2018 | Saha | G06F 16/90344 |
| 2019/0156256 A1 | 5/2019 | Argyros et al. | |
| 2020/0372057 A1 | 11/2020 | Tonkin et al. | |
| 2022/0019580 A1* | 1/2022 | Mirhaji | G06F 40/289 |
| 2022/0164683 A1 | 5/2022 | Hao et al. | |
| 2023/0030086 A1* | 2/2023 | Martinez Ayala | G06F 16/367 |
| 2023/0057167 A1 | 2/2023 | Yu et al. | |
| 2023/0074771 A1* | 3/2023 | Nefedov | G06F 16/9024 |
| 2023/0105237 A1* | 4/2023 | Dykema | G06F 16/5854 |
| | | | 715/255 |

(Continued)

OTHER PUBLICATIONS

Non-Final Office Action received in U.S. Appl. No. 18/382,988, May 29, 2025, 20 pages.

(Continued)

*Primary Examiner* — Amy Ng
*Assistant Examiner* — Antonio J Caiado
(74) *Attorney, Agent, or Firm* — Klarquist Sparkman, LLP

(57) ABSTRACT

Class definitions for an ontology of a domain are determined using a materialized instance graph, where the ontology is used for semantic query execution, automated analytical reasoning, or for machine learning. A plurality of instances graphs for a respective plurality of domain instances are received. A materialized instance graph is generated from the plurality of instance graphs. One or more communities represented in the materialized instance graph are determined. Properties associated with respective communities of the one or more communities are determined. Class definitions are generated, where a class corresponds to a community of the one or more communities and at least a portion of properties associated with the community. Class definitions are assigned to the ontology for the domain.

20 Claims, 32 Drawing Sheets

(56) References Cited

U.S. PATENT DOCUMENTS

2023/0252700 A1*  8/2023  Barlew ................. G06T 11/206
2025/0131030 A1    4/2025  Portisch et al.

OTHER PUBLICATIONS

Notice of Allowance received in U.S. Appl. No. 18/392,988 Oct. 27, 2025, 10 pages.
Response to Non-Final Office Action for U.S. Appl. No. 18/392,988, Aug. 28, 2025, 15 pages.

* cited by examiner

203

Everything that is positioned here must be a :Country

:capitalOf

201

Everything that is positioned here must be a :City

SPARQL results:

| City | Population |
|------|------------|
| Chongqing | 32054159 |
| Shanghai | 24870895 |
| Beijing | 21893095 |
| Chengdu | 20937757 |
| Xian | 12952907 |
| Suzhou | 12748252 |
| Zhengzhou | 12600574 |
| Wuhan | 12326500 |
| Hangzhou | 11936010 |
| Baoding | 11194382 |
| Linyi | 11018365 |
| Dongguan | 10466625 |
| Qingdao | 10071722 |
| Changsha | 10047914 |
| Harbin | 10009854 |
| Nanyang_Henan | 9713112 |
| Wenzhou | 9572903 |
| Foshan | 9498863 |
| Ningbo | 9404283 |

```
SELECT ?city ?population WHERE {
   ?city a dbo:City .
   ?city dbo:country :China.
   ?city dbo:populationTotal ?population .
   FILTER(?population > "100000"^^xsd:integer)
} ORDER BY DESC (?population)
```

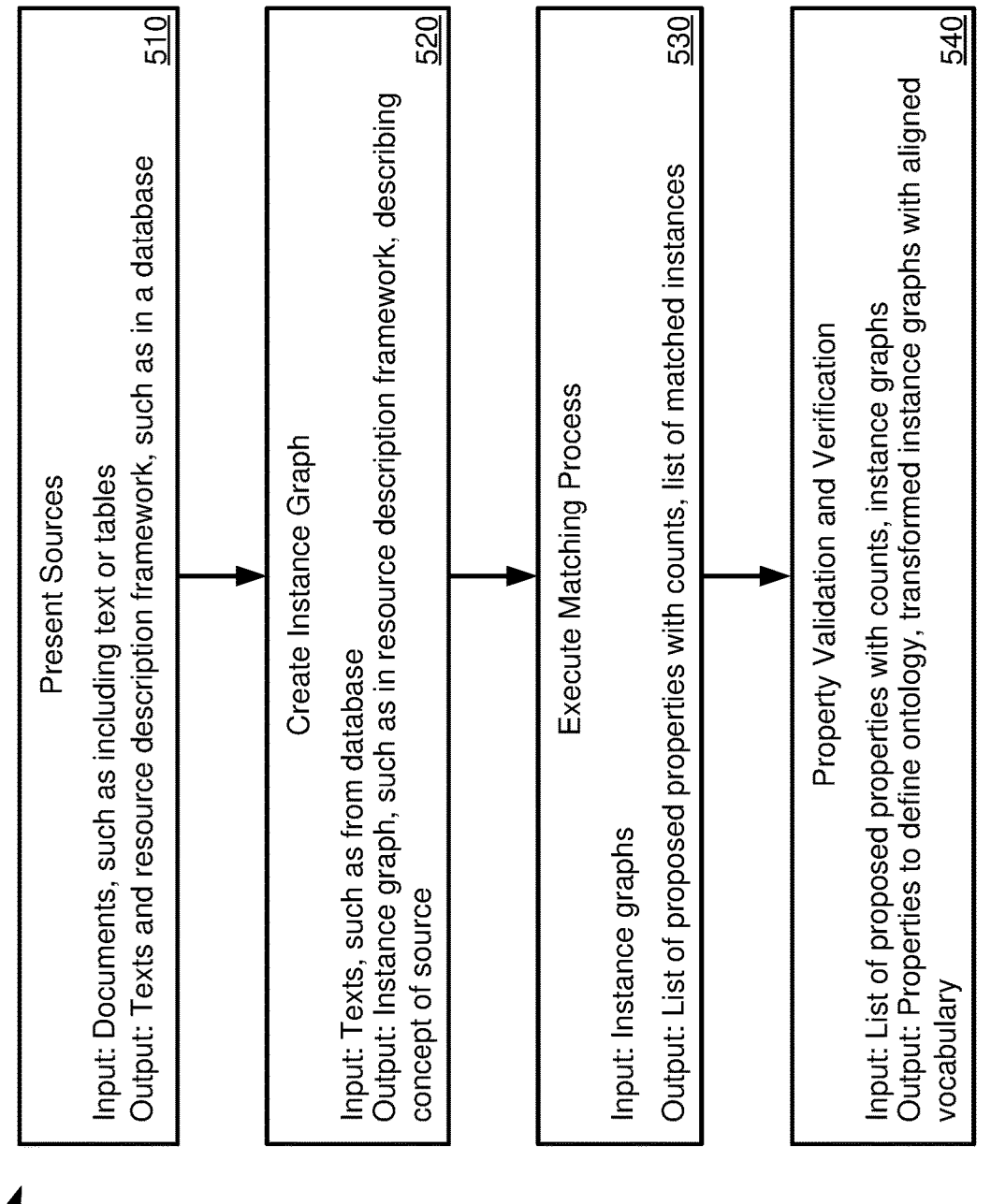

Present Sources 510

Input: Documents, such as including text or tables
Output: Texts and resource description framework, such as in a database

Create Instance Graph 520

Input: Texts, such as from database
Output: Instance graph, such as in resource description framework, describing concept of source

Execute Matching Process 530

Input: Instance graphs
Output: List of proposed properties with counts, list of matched instances

Property Validation and Verification 540

Input: List of proposed properties with counts, instance graphs
Output: Properties to define ontology, transformed instance graphs with aligned vocabulary

700

Introducing the All-New SAP SE

EMBRACE ELECTRIFIED LUXURY PERFORMANCE

In a league of its own, the all-new SAP SE seamlessly blends cutting-edge electric power with a stunning vehicle concept. This high-performance masterpiece, dressed in the guise of a Sports Activity Vehicle (SAV), boasts a groundbreaking plug-in hybrid system that delivers an impressive 480 kW (653 hp). With a design that knows no compromises and performance that will leave you spellbound, the SAP SE redefines luxury in the automotive world.

SAP SE:

Fuel efficiency (combined): 1.9–1.5 l/100km (WLTP)

Electric power consumption (combined): 33.6–33.5 kWh/100 km (WLTP)

$CO_2$ emissions (combined): 43–35 g/km (WLTP)

Electric range (combined): 76–83 km (WLTP)

FIG. 7A

720

The ideal blend of SAP SE's high-performance engineering and cutting-edge plug-in hybrid technology.

- SAP SE Hybrid, the inaugural electrified high-performance drive from SAP.
- Powered by a robust M TwinPower Turbo V8-cylinder gasoline engine.
- Experience unparalleled driving dynamics with the Adaptive SAP SE Sport Suspension.
- Enhanced handling and control with SAP SE's xDrive featuring Sport Differential.
- Boasting an impressive 480 kW (653 hp) and 800 Nm of torque, the SAP SE accelerates from 0 to 100 km/h in just 4.3 seconds.

FIG. 7B

730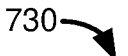

TECHNICAL SPECIFICATIONS OF SAP SE AUTOMOBILES.

Model SE

Drive Type: Gasoline – Plug-in Hybrid

Power in kW (HP): 480 (653)

Torque in Nm: 800

Transmission: 8-Speed, Automatic

Drivetrain: All-Wheel Drive

Cylinders: 8

Displacement in cm³: 4,395

Rated Power in kW (HP) / RPM: 360 (489) / 5,400 - 7,200

Rated Torque in Nm/RPM: 650 / 1,600 - 5,000

(Rated) Power/30-Minute Power in kW (HP): 145 (197)

(Rated) Torque in Nm:280

Acceleration 0-100 km/h in seconds:4.3

Top Speed in km/h: 250

Top Electric Speed in km/h:140

Fuel Consumption, Combined WLTP in l/100 km 6:n1.9 - 1.5

CO2 Emissions, Combined WLTP in g/km 6: 43 - 35

Electric Consumption, Combined WLTP in kWh/100 km 6: 33.6 - 32.5

Electric Range, WLTP in km 7: 76 - 83
8

Battery Size in kWh: 25.7

Max Charging Power AC/DC in kW: 7.4 (-) / -

Charging Time AC 0-100% in hours: 4.25 (-)

Length in mm:5,110

Width in mm:2,005

Height in mm: 1,755

Width in mm (with mirrors): 2,235 (1,127 / 1,108)

Wheelbase in mm: 3,105

Curb Weight in kg:2,785

Max Weight in kg: 3,300

Payload in kg:590

Cargo Volume in liters: 527 - 1,820

Fuel Tank Capacity in liters: 69
Towing Capacity Factory-Optional Braked up to 12% / Tongue Weight in kg 10:
2,700 / 140

FIG. 7C

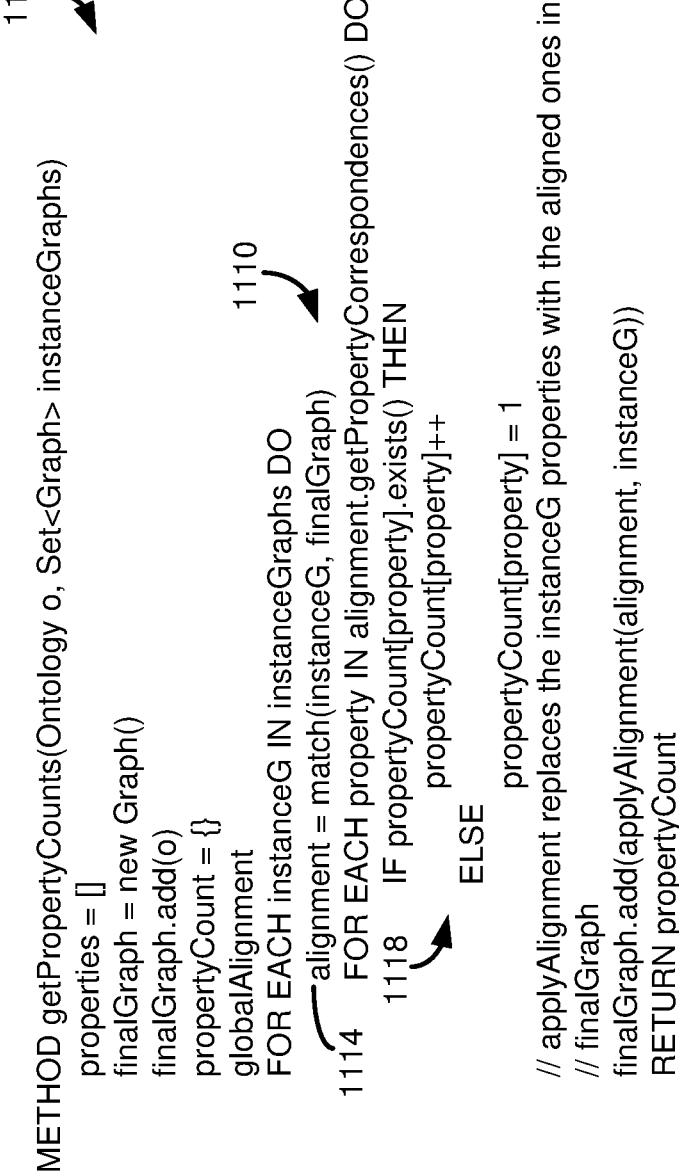

```
METHOD getPropertyCounts(Ontology o, Set<Graph> instanceGraphs)
    properties = []
    finalGraph = new Graph()
    finalGraph.add(o)
    propertyCount = {}
    globalAlignment
    FOR EACH instanceG IN instanceGraphs DO
        alignment = match(instanceG, finalGraph)
        FOR EACH property IN alignment.getPropertyCorrespondences() DO
            IF propertyCount[property].exists() THEN
                propertyCount[property]++
            ELSE
                propertyCount[property] = 1
    // applyAlignment replaces the instanceG properties with the aligned ones in
    // finalGraph
    finalGraph.add(applyAlignment(alignment, instanceG))
    RETURN propertyCount
```

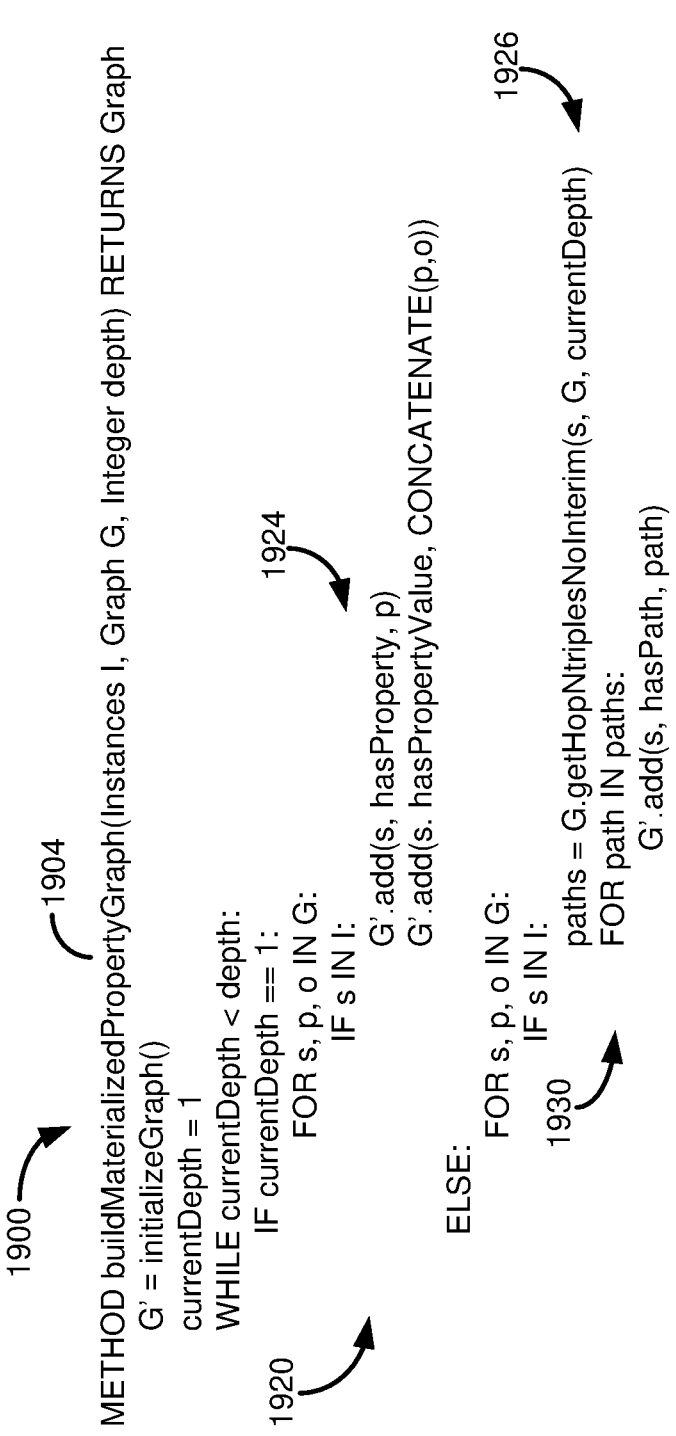

```
                                                            1900
METHOD buildMaterializedPropertyGraph(Instances I, Graph G, Integer depth) RETURNS Graph
    G' = initializeGraph()                                  1904
    currentDepth = 1
    WHILE currentDepth < depth:
        IF currentDepth == 1:                               1924
            FOR s, p, o IN G:
                IF s IN I:
                    G'.add(s, hasProperty, p)
                    G'.add(s. hasPropertyValue, CONCATENATE(p,o))
        ELSE:                                               1920
            FOR s, p, o IN G:
                IF s IN I:
                    paths = G.getHopNtriplesNoInterim(s, G, currentDepth)   1926
                    FOR path IN paths:
                        G'.add(s, hasPath, path)            1930
```

FIG. 19

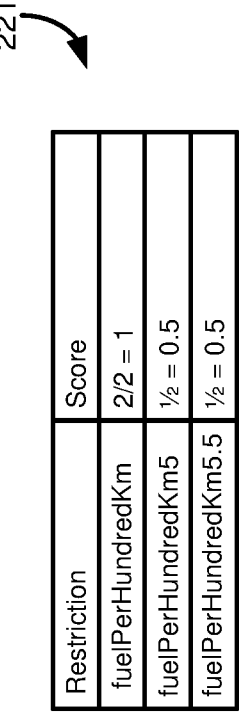
| Restriction | Score |
|---|---|
| fuelPerHundredKm | 2/2 = 1 |
| fuelPerHundredKm5 | ½ = 0.5 |
| fuelPerHundredKm5.5 | ½ = 0.5 |
2210
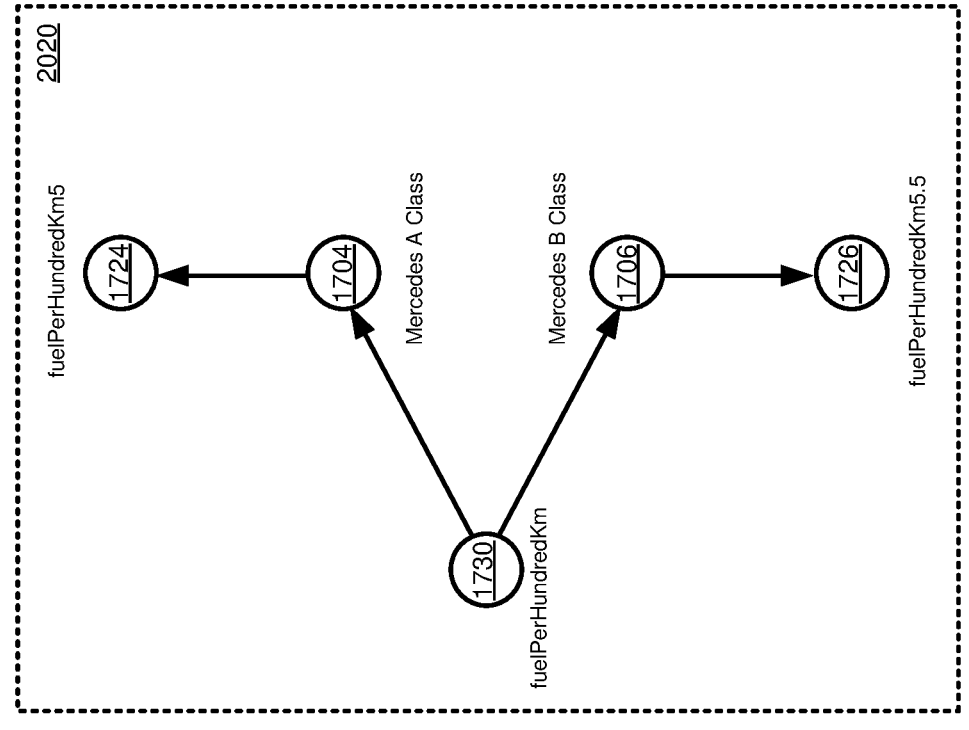
FIG. 22

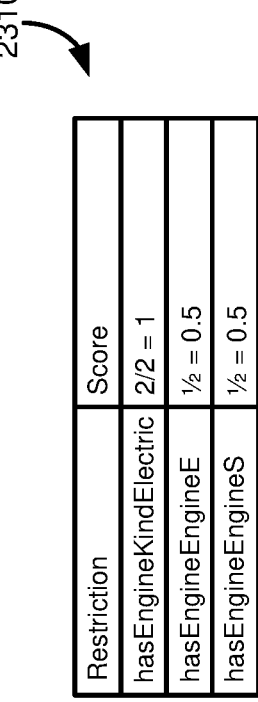
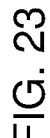
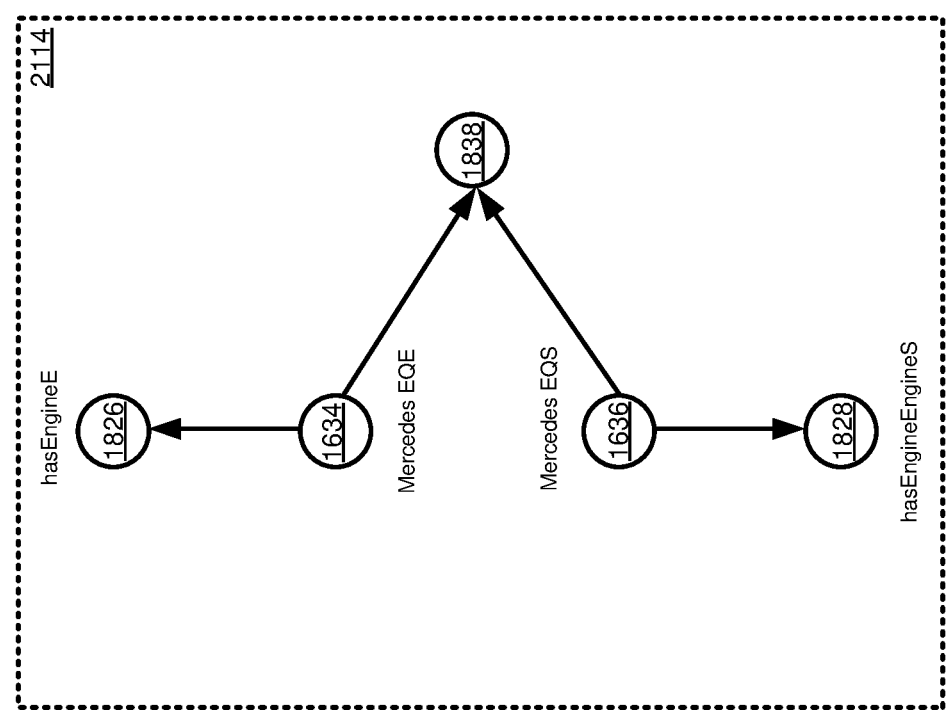
FIG. 23

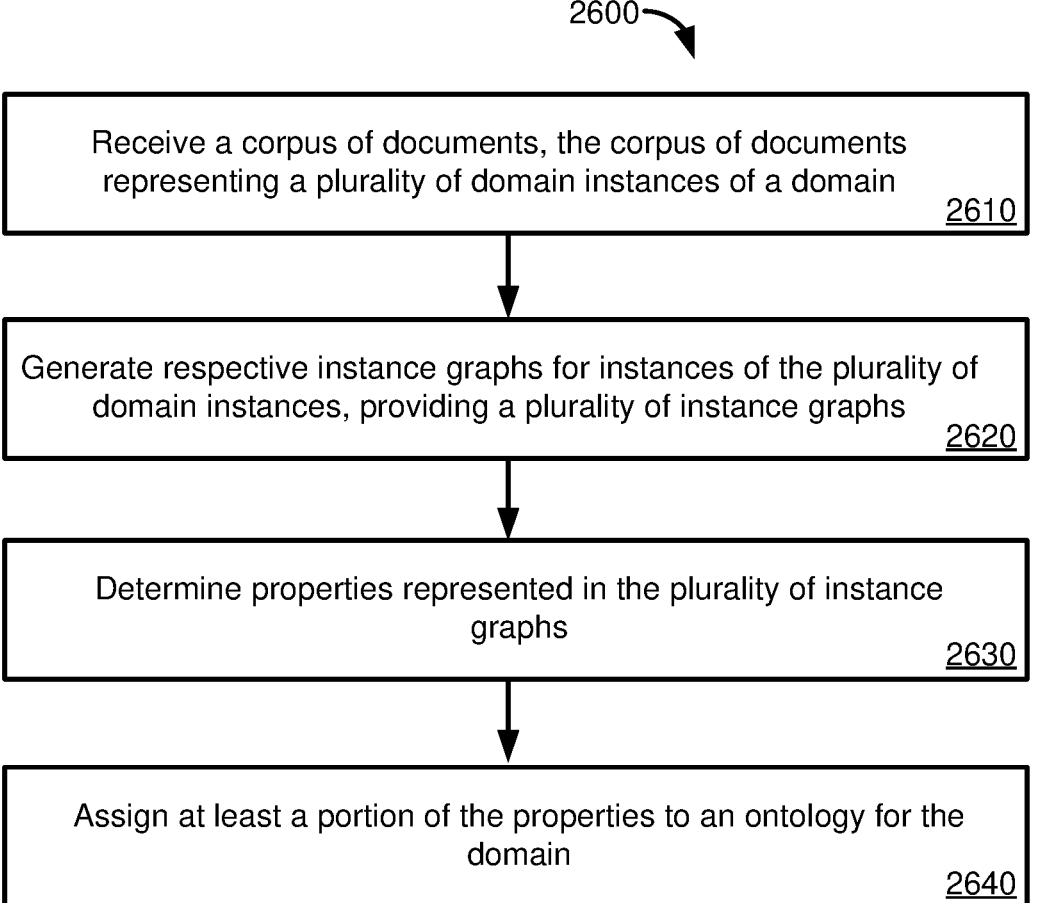

2600

Receive a corpus of documents, the corpus of documents representing a plurality of domain instances of a domain
2610

Generate respective instance graphs for instances of the plurality of domain instances, providing a plurality of instance graphs
2620

Determine properties represented in the plurality of instance graphs
2630

Assign at least a portion of the properties to an ontology for the domain
2640

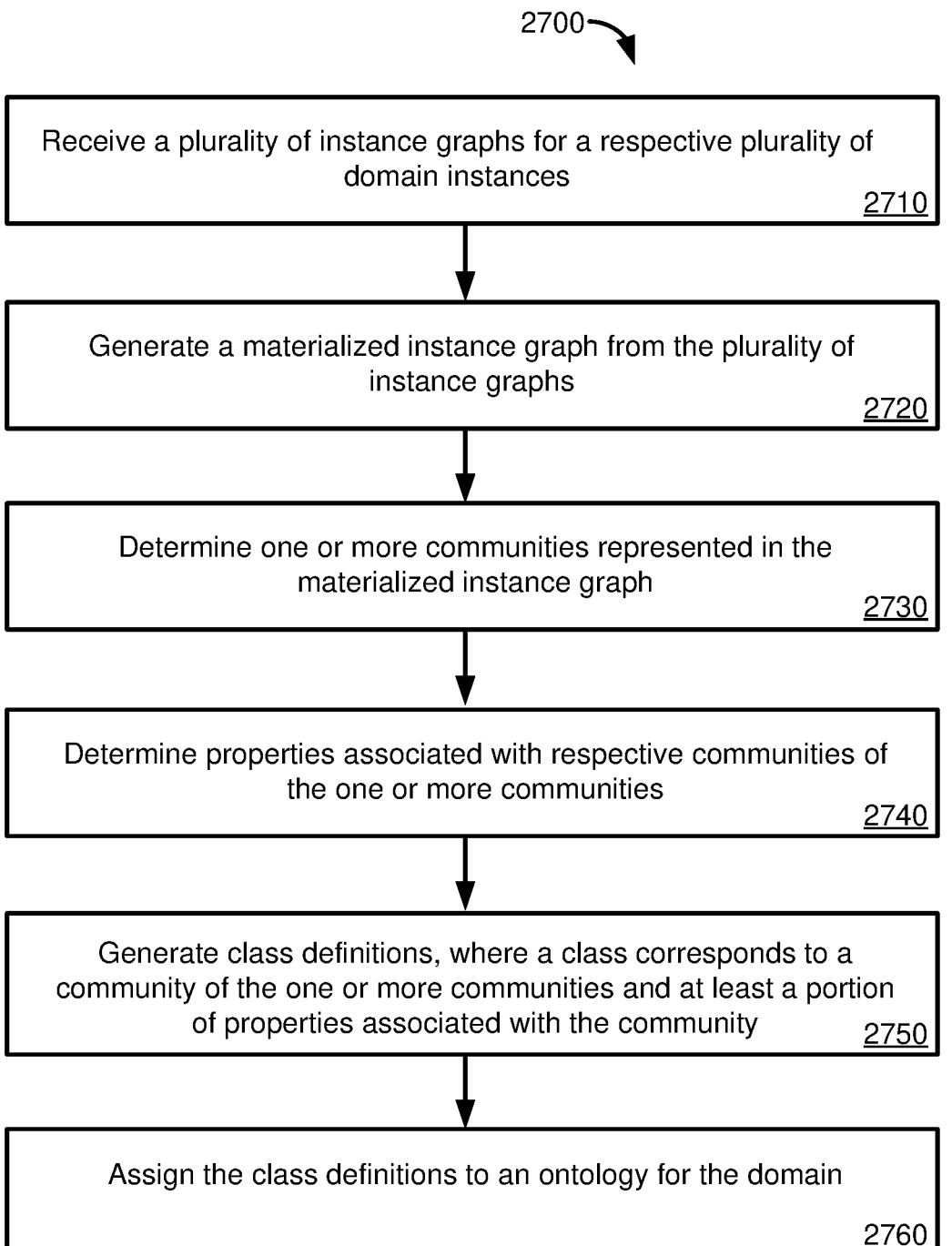

Receive a plurality of instance graphs for a respective plurality of domain instances

2710

Generate a materialized instance graph from the plurality of instance graphs

2720

Determine one or more communities represented in the materialized instance graph

2730

Determine properties associated with respective communities of the one or more communities

2740

Generate class definitions, where a class corresponds to a community of the one or more communities and at least a portion of properties associated with the community

2750

Assign the class definitions to an ontology for the domain

AUTOMATED ONTOLOGY CREATION

FIELD

The present disclosure generally relates to automated processes for determining components of an ontology.

BACKGROUND

Ontologies are important to a variety of computer implemented processes. For example, ontologies can be used in linking data in the Semantic Web, in natural language processing, in query processing (such as by converting concepts into SQL), and data integration (integrating data having a common semantic concept). Further, ontologies can be used in artificial intelligence systems, including large language models, the use of which is currently undergoing explosive growth.

Typically, ontologies are created manually. Manual creation of ontologies can be extraordinarily time consuming, particular when a large number of concepts are to be expressed in an ontology. Further, manually created ontologies can vary depending on a user developing an ontology, including the use of different labels for a common semantic concept, and whether users happen to identify particular concepts—that is, some users may identify ontological concepts that might be overlooked by other users. Thus, current techniques for developing ontologies can be very time consuming, can contain errors (including not identifying relevant semantic concepts), and can be subject to terminology variation that can make use and comparison of ontologies and ontological processing difficult. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, the present disclosure provides a process of determining properties to be assigned to an ontology using instance graphs. A corpus of documents is received. The corpus of documents represents a plurality of domain instances of a domain. A respective plurality of instance graphs for instances of the plurality of domain instances are generated, providing a plurality of instance graphs. Properties represented in the plurality of instance graphs are determined. At least a portion of the properties are assigned to an ontology for the domain. The ontology is used to execute semantic queries, for automated analytical reasoning, or for machine learning.

In another aspect, the present disclosure provides a process of generating class definitions for an ontology using instance graphs. A plurality of instance graphs for a respective plurality of domain instances are received. A materialized instance graph is generated from the plurality of instance graphs. One or more communities represented in the materialized instance graph are determined.

Properties associated with respective communities of the one or more communities are determined. Class definitions are generated, where a class corresponds to a community of the one or more communities and at least a portion of properties associated with the community. The class definitions are assigned to an ontology for the domain. The ontology is used to execute semantic queries, for automated analytical reasoning, or for machine learning.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 3 shows an exemplary SPARQL query and results of the query.

FIG. 5 is a flowchart of a method for extracting properties from a set of source documents.

FIGS. 7A-7C illustrate example source documents having information from which properties can be extracted.

FIG. 11 provides example pseudocode for aligning instance graphs, such as using a common vocabulary, and counting the occurrence of particular properties in a set of instance graphs.

FIG. 19 provides example pseudocode for a graph materialization process.

FIGS. 22 and 23 illustrate how contributions of particular nodes in the subgraphs of FIGS. 20 and 21 to a particular subgraph (which can represent a class) can be analyzed.

FIG. 26 is a flowchart of a process of determining properties to be assigned to an ontology using instance graphs.

FIG. 27 is a flowchart of a process of generating class definitions for an ontology using instance graphs.

DETAILED DESCRIPTION

Example 1—Overview

Figure 1:
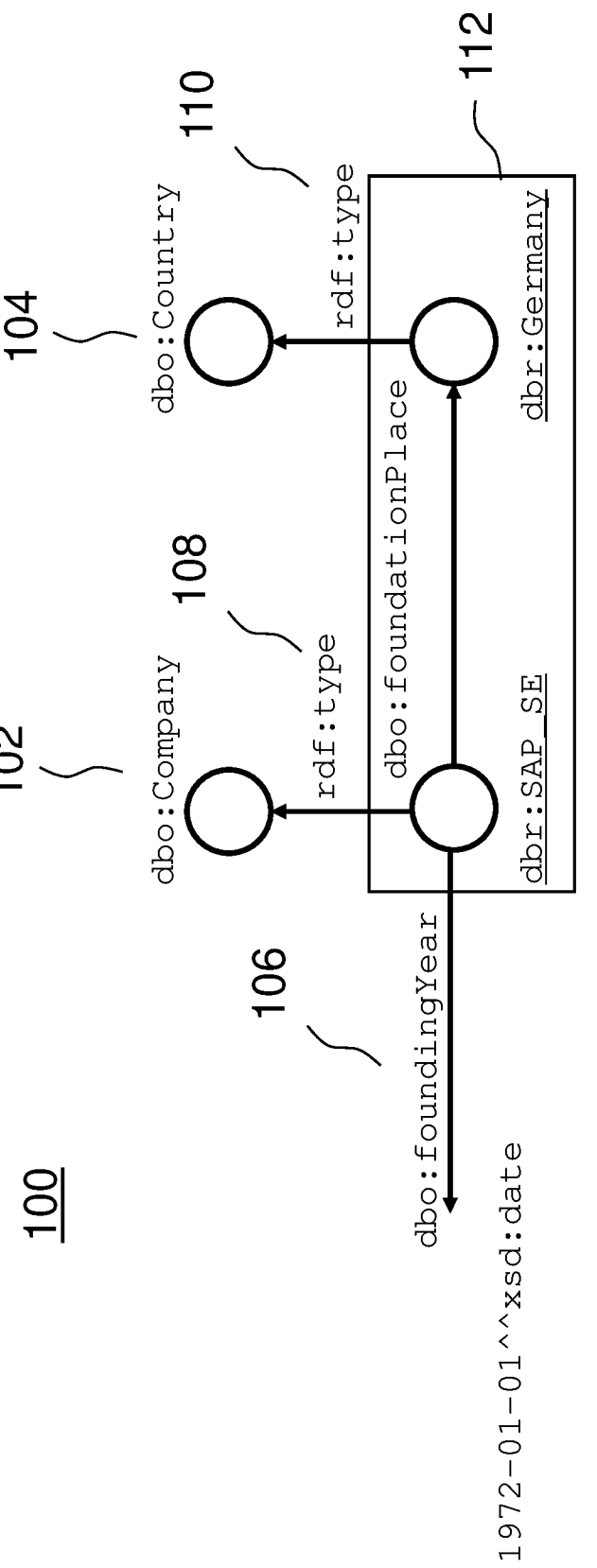
FIG. 1 shows an exemplary directed graph.

Ontologies are important to a variety of computer implemented processes. For example, ontologies can be used in linking data in the Semantic Web, in natural language processing, in query processing (such as by converting concepts into SQL), and data integration (integrating data having a common semantic concept). Further, ontologies can be used in artificial intelligence systems, including large language models, the use of which is currently undergoing explosive growth.

Typically, ontologies are created manually. Manual creation of ontologies can be extraordinarily time consuming, particular when a large number of concepts are to be expressed in an ontology. Further, manually created ontologies can vary depending on a user developing an ontology, including the use of different labels for a common semantic concept, and whether users happen to identify particular concepts—that is, some users may identify ontological concepts that might be overlooked by other users. Thus, current techniques for developing ontologies can be very time consuming, can contain errors (including not identifying relevant semantic concepts), and can be subject to terminology variation that can make use and comparison of ontologies and ontological processing difficult. Accordingly, room for improvement exists.

The present disclosure provides techniques for automatically determining elements of an ontology. In one aspect, described in Examples 3-7, a set of documents, or knowledge graphs created from or defined for such documents, are analyzed to determine properties that may be associated with an ontology. For example, a document corpus may include documents describing one or more instances of a particular ontological concept. If a graph representation of elements in the documents does not exist, it can be created, including by processing text of the documents using an information extraction technique.

Information from multiple instance graphs can be combined to determine properties for an ontology for the ontological concept (also referred to as a "domain") associated with the instance graphs. In some implementations, properties that appear in one or more instance graphs can be counted, where a number of instances in which a given property appears can more strongly indicate that a property is relevant to the ontological concept.

A common ontological concept may be associated with different labels in different instances, including within documents or knowledge graphs describing the same instance.

Thus, a label alignment process can be carried out to determine sets of labels that refer to the same ontological property. Instance graphs can then be updated to use a standard label defined for the ontological property. Performing the alignment also helps ensure that the property count process described above is accurate.

In some cases, a user can define instances, including documents associated with a particular instance. In other cases, a computer-implemented process analyzes a set of documents, or knowledge graph representations thereof, and creates suggested instances. A variety of user interfaces are provided, including for selecting documents or knowledge graph representations of documents, for defining instances, including modifying any suggested instances and modifying documents or knowledge graphs associated with particular instances, for modifying instance knowledge graphs, for selecting a label for a "core" ontological property, or for selecting properties to be included in an ontology.

In another aspect, the present disclosure provides techniques for discovering classes in an ontology, such as described in Examples 8-16. The technique uses as input property knowledge graphs for instances of an ontological concept. In a specific implementation, the instance property knowledges graphs can be created using the techniques of Examples 3-7, including performing a terminology alignment and applying standard labels to the instance property knowledge graphs.

From the instance property knowledge graphs, a materialized property graph can be generated that represents multiple instances. In some cases, an intermediate knowledge graph can be defined that includes multiple instances and their associated properties, and this can be converted to a materialized knowledge graph. In other cases, the materialized knowledge graph that includes properties for multiple instances can be created directly from graph information for individual instances.

A materialized knowledge graph differs from a knowledge graph in that relationships (that is, properties, or predicates, including as those terms are used in RDF (Resource Description Framework) triples) are represented as nodes in the materialized property graph, rather than as edges. Some relationships can be represented as a label for a node in a concatenated form, such as representing a path between a source and an object using only property information for "intermediate" nodes, and where values, such as literals, for a particular "target" object can be concatenated in a label for a particular node of the materialized knowledge graph.

The materialized graph allows graph decomposition techniques to be applied. For example, various rules can be applied to remove nodes from the materialized knowledge graph, where node removal provides subgraphs. The subgraphs can correspond to classes. The process can be repeated, so that the classes can be further divided into subclasses. A user can provide properties that can guide a class discovery process, such as a maximum or minimum number of classes to generate, or a minimum or maximum number of properties that a class should possess. In a more specific example, a user can provide a parameter that defines a "breadth" factor, such as how many classes (including at a given hierarchical level) should be identified, as well as a parameter that defines a "depth" factor, such as guiding a subclass identification process (since, for example, just as classes can be divided into subclasses, subclasses can be further divided into subclasses). The use of property parameters can help ensure that classes are not too broadly or narrowly defined, including avoiding situations where a subdivision process might identify subgraphs, but where the subgraphs do not really correspond to subclasses.

Providing class names can also be a time-consuming process. In some aspects, a class discovery process can include analyzing a set of classes to provide proposed class names.

Once classes are defined, the class definitions can be used to classify data for other instances of an ontological concept.

Disclosed techniques allow for the discovery of ontological properties or classes with little to no user input, other than identifying an initial data set used by the disclosed techniques. Thus, ontologies can be developed far more quickly that would be possible manually, including not only generating an ontology, but a computer representation of an ontology (such as in a graph or equivalent data structure). Further, use of defined computing processes can provide more accurate or complete ontologies, including by harmonizing different labels that may be used in input data sets.

As described above, ontologies, or components thereof (classes, properties), can be applied in a variety of computing contexts. For example, 1, the ontologies can assist with data integration and harmonization. Disparate data sources often have heterogeneous formats, leading to silos that impede effective data usage. A computer representation of an ontology serves as a standardized framework, allowing for seamless integration of these diverse data sets. For instance, in a healthcare context, data from various hospitals, labs, and clinics, each with its distinct schema, can be integrated under a unified ontology. This technical alignment ensures that when a term (like "patient age") is queried, the system can retrieve it regardless of its original source or format, ensuring efficient data extraction and reducing computational overhead.

Computer implemented ontologies can also provide improved semantic search and querying. Traditional keyword-based searches can return imprecise or irrelevant results due to the ambiguity of human language. Utilizing an ontology elevates search mechanisms from mere string matching to understanding the context and semantics. For example, a query for "Apple" in a tech database might be referring to the company and not the fruit. An ontology-aware system understands this distinction and can prioritize results based on the contextual relevance, reducing computational waste from parsing irrelevant data and enhancing user experience by delivering more accurate results.

Another use of computer implemented ontologies is in automated reasoning and inference. With a well-constructed ontology, a system can derive new knowledge by understanding relationships and hierarchies defined within the ontology. For instance, if an ontology defines "all mammals are vertebrates," and "dogs are mammals," a computer system can infer that "dogs are vertebrates." This ability is especially pivotal in domains like biomedical research, where deducing inexplicit relationships can lead to significant insights. By reducing the need for explicit programming for every logical relationship, ontologies provide scalability and flexibility in evolving datasets.

Machine learning can also benefit from computer implemented ontologies. Machine learning models often require structured, labeled data for training. Ontologies provide a structured view of knowledge, helping in data preprocessing and feature extraction. For instance, in natural language processing tasks, an ontology can help in entity recognition by providing a hierarchy of concepts. Furthermore, in multimodal learning scenarios, where data from different sources or formats (e.g., text, images, sound) is used, ontologies can help align and correlate features from these diverse sources, leading to better model performance and interpretability.

Computer implemented ontologies facilitate interoperability and communication. For example, ontologies provide a shared vocabulary for different stakeholders in a project, ensuring consistent understanding and interpretation of terms. This is particularly beneficial in collaborative projects spanning across disciplines or organizations. For instance, in a supply chain involving multiple companies, an ontology can ensure that when one company refers to a "shipment," others understand its exact meaning, attributes, and context. By providing a clear and unambiguous structure, ontologies reduce miscommunication, ensure data compatibility, and streamline collaborative computational processes. From a computing standpoint, the elements of a supply chain can be represented in a computer implemented format, such as relational database tables or using other types of data objects. Thus, computing systems of different entities, or different software programs of different entities, can have greater interoperability using a shared ontology.

Example 2—Example Knowledge Graphs

An enterprise may have a variety of different products, services, and teams. The enterprise may also have a comprehensive knowledge graph, storing knowledge regarding skills, processes, experiences, capabilities, and insights that are relied upon in day-to-day operations of the enterprise. Contents of the knowledge graph may also include enterprise specific acronyms, departments of the enterprise, and product specifications. The knowledge may enable the enterprise to react to business situations in a fast, professional, and flexible manner. The knowledge graph may be expensive and labor intensive to construct and maintain. The knowledge graph (i.e., semantic web and/or web of linked data) may be specified using the Resource Description Framework (RDF).

Generally, a knowledge graph, or a subgraph/subset thereof, includes a plurality of nodes connected by edges. The nodes may represent real-world entities and the edges may represent relations between entities or relations between entities and types (i.e. classes) of the entities. Hence, predicates can be distinguished depending on whether they connect two entities or an entity and an entity type. The entities may also be referred to as resources. For each statement, the subject may correspond to a node, the object may correspond to a (different) node and an edge corresponding to the predicate may connect the subject node to the object node. Depending on a particular application, edges can be directed or can be undirected. For purposes of the present disclosure, examples are generally described as using directed graphs, such as graphs described using RDF. However, disclosed techniques can be adapted to be used with other types or implementations of graphs, including with undirected graphs.

The nodes may have corresponding classes, such that each of the nodes has a corresponding class. The (corresponding) classes may be part of (or organized in) a schema (i.e., a data schema or an ontology). The schema may be defined in the RDF or the Web ontology language.

The following are examples of classes:

:State a rdfs:Class.

:EuropeanState a rdfs:Class.

:City a rdfs:Class.

Hence ":State" is a resource that is a class, more specifically, an RDF class. The class ":EuropeanState" is another resource that is a class, more specifically, a subclass of ":State" Hence, hierarchies of classes are possible. Moreover, multiple inheritance is also possible.

In addition, or alternatively, the directed graph may be labeled and multi-relational. Accordingly, both the nodes and edges may have labels and the edges may have directions. The objects of the statements may be labels of the directed graph. The directed graph may be multi-relational in the sense that the edges have different labels. The nodes of the directed graph may be subjects or objects and the edges may be predicates.

In addition, or alternatively, the schema may include properties. Each of the properties may apply to at least one of the classes of the schema. At least one of the properties may have a domain and/or a range. Each of the properties may be used by (or apply to) at least one statement. The domain (e.g., rdfs: domain) may specify a class to which a subject belongs and the range (e.g., rdfs:range) may specify a class to which an object belongs. More specifically, the domain may specify a class to which the subject of the statement belongs, and the range may specify a class to which an object of the statement belongs. With regard to the RDF Schema, please refer to the W3C RDF Schema specification, https://www.w3.org/TR/rdf-schema/.

The following are examples of properties:
rdf:type a rdf:Property
dbo:foundationPlace a rdf:Property.
:EuropeanState rdfs:subClassOf:State.
:locatedIn a rdf:Property.
:capitalOf a rdf:Property.
:capitalOf rdfs:subPropertyOf:locatedIn.

Hence, ":locatedIn" and ":capitalOf" are properties. Moreover, ":capitalOf" is a subproperty of ":locatedIn". Hence, properties can also form hierarchies. The property ":EuropeanState rdfs:subClassOf :State" indicates that ":EuropeanState" is a subclass in a class hierarchy including the class ":State" and the subclass ":EuropeanState".

Hence, the schema may provide a vocabulary for the directed graph (e.g., knowledge graph). The directed graph may have predefined property prefixes, which can indicate whether a node (i.e., a subject or object) is an instance of a class or a class (e.g., a node may be a class if the node has a prefix "dbo," which represents DBpedia ontology, and a node may be an instance if the node has a prefix "dbr," which represents DBpedia resource). In certain cases, the directed graph can use URI design to differentiate between instances and classes. The directed graph may include statements which explicitly indicate certain nodes are classes. In certain cases, whether a specific node represents an instance or a class can depend on the underlying model. For example, whether a node is a class (and included in the schema of the directed graph) or an instance (thus is not included in the schema of the directed graph) can be determined by checking the rdf: type property: If the type is owl: Class, then the node is a class and is included in the schema; otherwise the node is instance (i.e., instance of a class) and is not included in the schema.

Compared to relational databases, the knowledge graph has a more flexible data structure because the types of data provided by the knowledge graph can vary. For example, properties associated with different instances can differ even though these instances share the same class (e.g., "SAP_SE" and "BASF_SE" can have different property data available although they share the same class "Company"). On the other hand, a relational database can be represented in a knowledge graph format, i.e., the knowledge graph can be a higher-level abstraction of the relational database.

In certain examples, the nodes in the directed graph (e.g., knowledge graph) can be organized in a hierarchical structure where a lower-level node (representing a more specific object) may be connected to a higher-level node (representing a more generic object) by one or more edges. The lower-level node (or the lower-level object it represents) can be called a descendant of the higher-level node (or the higher-level object it represents), and the higher-level node (or the higher-level object it represents) can be called an ancestor of the lower-level node (or the lower-level object it represents).

FIG. 1 shows a subset 100 of a directed graph. More specifically, FIG. 1 shows a subset 100 of a knowledge graph. Nodes of the directed graph are shown as circles and edges of the directed graph are shown as arrows. The subset 100 of the directed graph includes labels 102, 104, 106, 108, 110, where the labels are URIs and defined in the resource description framework (RDF). The node labels 102 and 104 are objects, the edge labels 106, 108, 110 are predicates. The string "1972 Jan. 1" may also be a node label (i.e., an object) having a type of xsd:date.

The subset 100 of the directed graph includes a statement 112 (i.e., triple statement) having a subject "dbr:SAP_SE", a predicate "dbo:foundationPlace" and an object "dbr: Germany", each of which are URIs defined in RDF. An exemplary serialization of the statement 112 is dbr:SAP_SE dbo:foundationPlace dbr: Germany. A schema of the directed graph may be defined via RDF schema (RDFS) or Web Ontology Language (OWL) from the World Wide Web Consortium (W3C).

Figure 2:
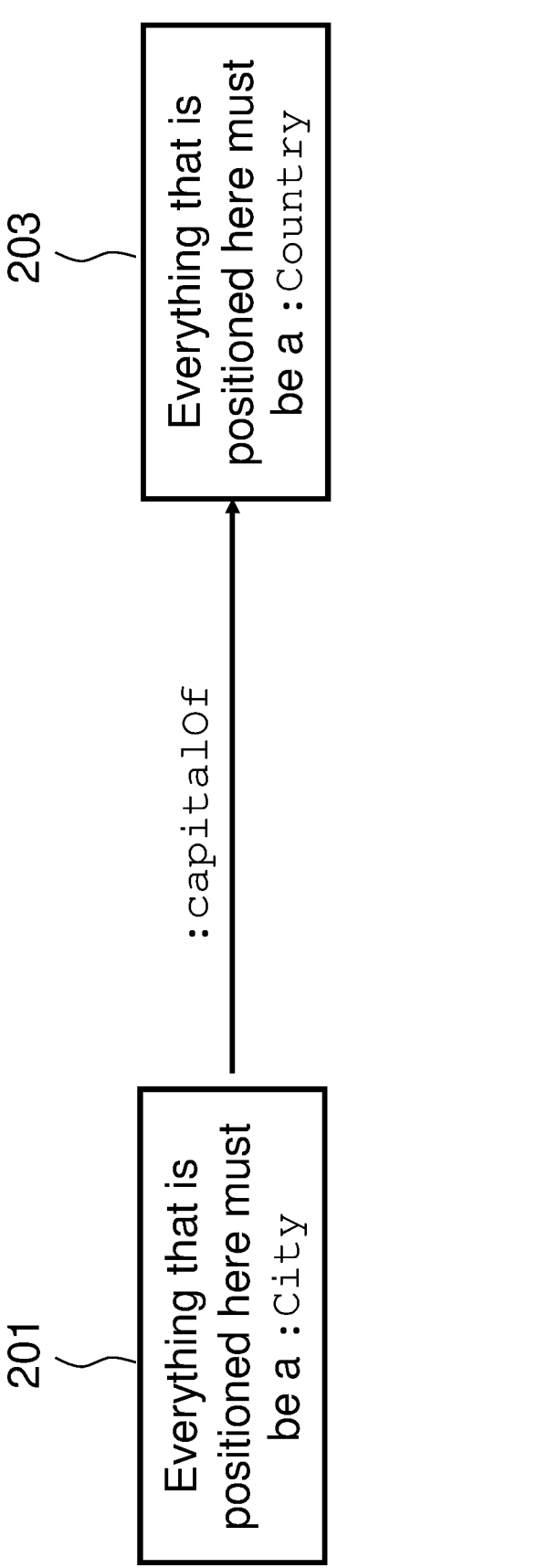
FIG. 2 shows the domain and range of a property in a schema of a directed graph.

FIG. 2 shows a domain 201 and a range 203 of a property, ":capitalOf". The domain 201 and the range 203 may be defined as follows:
:capitalOf rdfs:domain :City.
:capitalOf rdfs:range :Country.

FIG. 3 shows an exemplary SPARQL query 301 of a knowledge graph. The query 301 is configured to determine an answer to the following question: what is the population of cities in China which have more than 100,000 inhabitants? The results of executing the query 301 are also shown.

Figure 4:
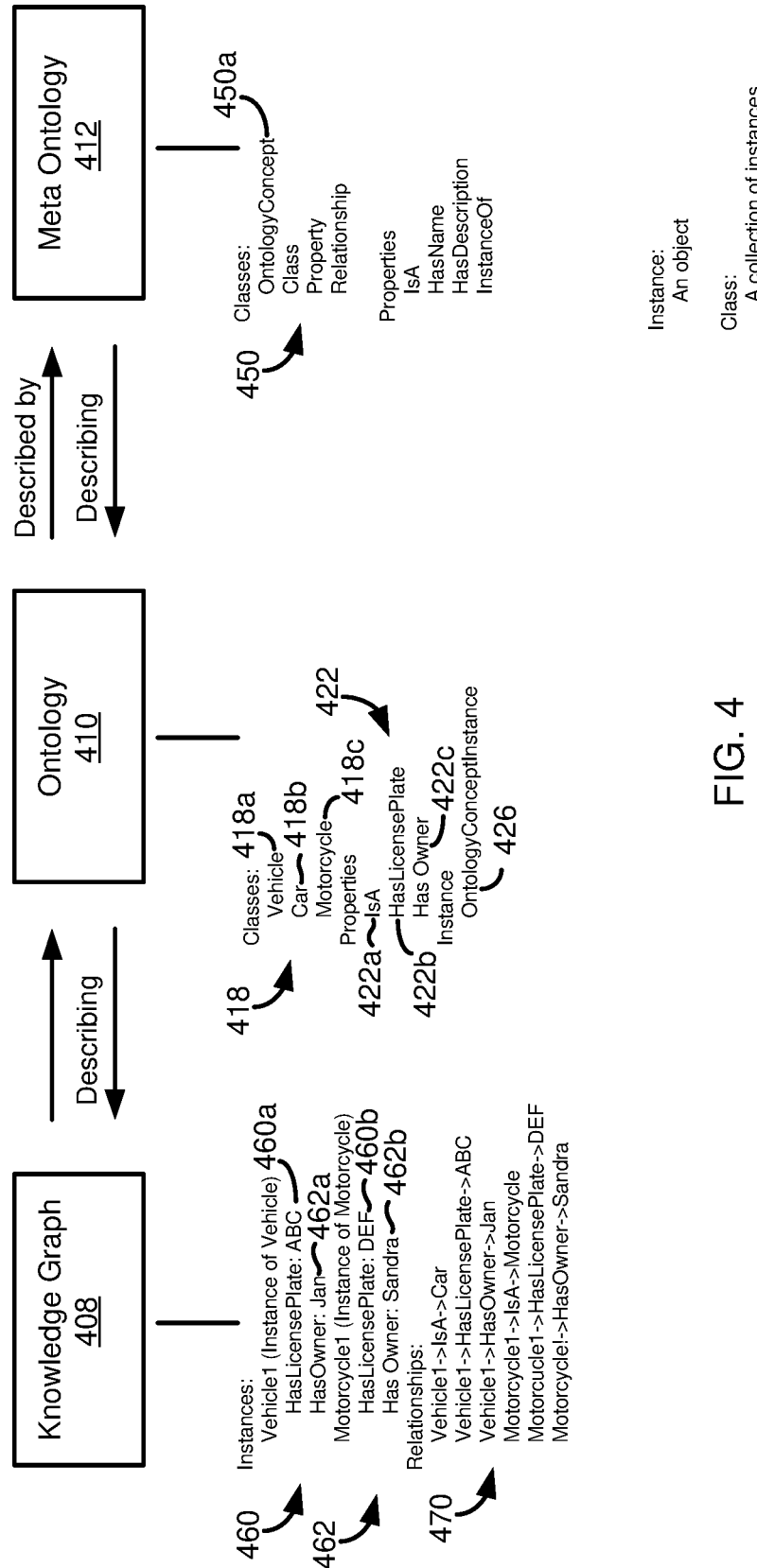
FIG. 4 is a diagram illustrating relationships between, and components of, a knowledge graph, an ontology, and a meta ontology.

Example 3—Example Relationships Between Knowledge Graphs, Ontologies, and Meta Ontologies FIG. 4 is a diagram illustrating relationships between a knowledge graph 408, an ontology 410 for the knowledge graph, and a meta ontology 412 for the ontology. The ontology 410 can be used to describe elements of the knowledge graph 408. In a similar manner, the meta ontology 412 can be used to describe elements of the ontology 410. The knowledge graph 408 can be considered in some ways as an instance of the ontology 410, and the ontology can be considered as an instance of the meta ontology 412. Generally, concepts are described from a more concrete perspective to a more conceptual perspective going from the knowledge graph 408, to the ontology 410, to the meta ontology 412.

Aspects of the present disclosure are described with respect to the specific example of motor vehicles, which can be referred to generally as vehicles or as more specific vehicle types, such as cars and motorcycles.

Looking at the ontology 410, it can be seen that the ontology describes several classes 418, such as a vehicle 418a, a car 418b, or a motorcycle 418c. The ontology 410 also defines a number of properties 422, such as properties that can be possessed by a class 418, or, more particularly, properties that can be possessed by an instance of a class. In this example, a property 422*a* can be an isA property, such as a property that can be used to define a particular instance as an instance of a particular class 418. Properties 422*b* and 422*c* describe particular properties of the classes 418, such as, respectively, a property of having a license plate or a property of having an owner. As described, the ontology 410 can itself be considered as an instance of the meta ontology 412, and an instance identifier 426 indicates that the ontology is an instance of the meta ontology, as being an instance of an ontology concept class 450*a* of classes 450 of the meta ontology.

The knowledge graph 408 is shown as including an instance 460 of the vehicle class 418 and an instance 462 of the motorcycle class 418*c*. Each instance 460, 462 includes values 460*a*, 460*b*, 462*a*, 462*b* for the properties 422*b*, 422*c*. The knowledge graph 408 also defines various relationships 470. For example, the relationships 470 can associate a particular node with a particular class 418 of the ontology 410, or can associate a node with a particular property 422, and a corresponding value for the property.

As described, the meta ontology 412 describes concepts used in the ontology 410 at a higher conceptual level. For example, the ontology 410 has particular classes 418, while the meta ontology 412 specifies the concept of a class. Similarly, the meta ontology 412 defines concepts such as properties and relationships, including a property where one object can be an instance of another object.

For purposes of the present disclosure, an object is used to refer to a particular instance of a class, where a class is represented by a collection of instances. The class, and its instances, can have properties, including datatype properties and object properties. For example, object properties can refer to relationships between objects (which can also be referred to as instances, entities, or resources), while datatype properties associate objects with literal values.

Example 4—Example Property Identification Process

FIG. 5 illustrates a flowchart of a process 500 for automatically extracting properties from a dataset. Sources are presented at 510. The sources correspond to data representing one or more instances of a class. Examples of source include electronic documents, such as text documents or tables. Sources contain electronic data, but need not be in any specific format. The data can be structured, such as in CSV format, or may be unstructured, such as free text of word processing documents. In some cases, rather than directly providing a source, a source location can be specified, such as using a URL, and the data for the source can be retrieved using the URL.

In at least some implementations, data from sources can be extracted and converted to one or more common formats. For example, documents (or, more generally, "files") having text can have the text extracted as a string. The strings can be used to generate a graph of concepts in the string, such as a graph in RDF format. Some documents, such as webpages, can include an RDF description natively (such as using JSON-LD, Microdata, or RDFa), and so the RDF description can be extracted in RDF format. Some documents may have some text already represented in RDF format and other text only represented in non-RDF format. In such cases, text elements that are not in RDF format can be extracted as strings, converted to RDF format, and optionally connected to the existing RDF description in the source.

Instance graphs are created at 520. The input can be text extracted from documents at 510. The input can be processed using information extraction techniques, such as using OpenNRE (github.com/thunlp/OpenNRE, where NRE stands for neural relation extraction), which can extract relationships from input text. In some cases, a knowledge graph can be generated using coreference resolution, named entity linking, and relationship extraction (such as described at neo4j.com/blog/text-to-knowledge-graph-information-extraction-pipeline/). Generally, information extraction can be performed using one or more of pattern matching, machine learning, named entity recognition, or dependency parsing, including as known in the fields of information extraction, natural language processing, and knowledge graph construction. Another suitable information extraction technique is disclosed in U.S. patent application Ser. No. 17/973,322, filed Oct. 25, 2022, incorporated by reference herein to the extent not inconsistent with the present disclosure.

Using the instance graphs, a matching process is executed at 530. The matching process of 530 produces a list of proposed properties, and a list of instances that contain such properties. Note that the properties need not be associated with classes, and that the list of properties need not all use the same name for a property that represents a common semantic concept. That is, the matching process can account for differences in terminology used to describe the same property. For example, different instances might use "fuel economy," "mileage," or "fuel efficiency" to refer to the same property.

While any suitable matching technique can be used, suitable matching techniques include those described in U.S. Pat. Nos. 11,487,721 and 11,263,187, which are hereby incorporated by reference.

The results of the matching process 530 are provided as input to a property validation and verification operation 540. The operations at 540 include selecting properties to be used in an ontology, including resolving differences in terms/labels for particular properties. If desired, the instance graphs obtained at 420 can be transformed to use an aligned vocabulary. In some cases, the operations at 540 can be at least particularly automated, while in other cases at least some of the operations can be performed by a user.

Figure 6:
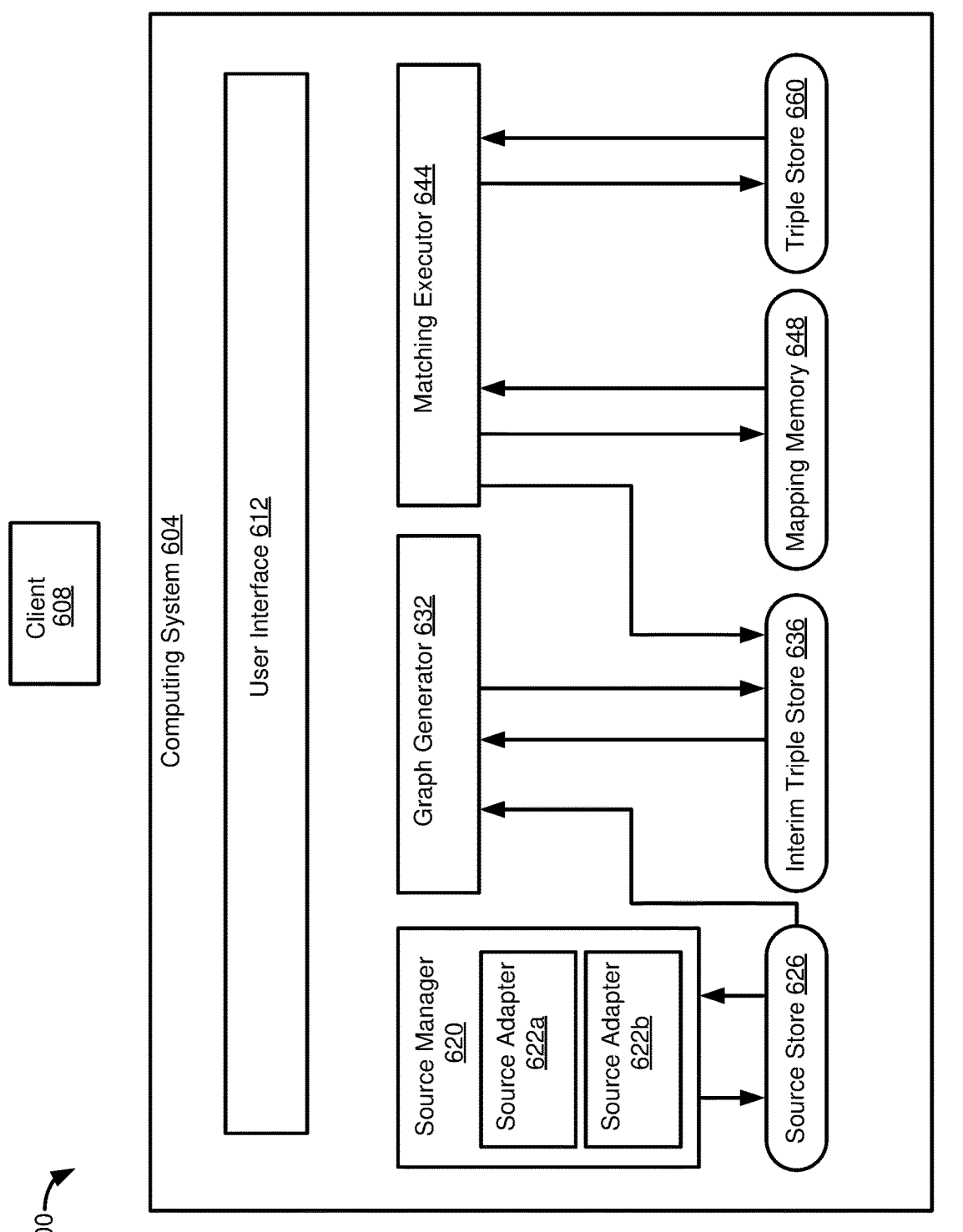
FIG. 6 is a diagram of a computing environment in which disclosed techniques for property extraction can be performed.

Example 5—Example Computing Environment Implementing Property Identification Process FIG. 6 provides an example computing environment 600 in which disclosed techniques can be implemented. For example, the computing environment 600 can be used to perform operations of the process 500 of FIG. 5.

The computing environment 600 includes a computing system 604 that is in communication with a client 608. The computing system 604 can include a user interface 612 that can be used by the client 608 to perform various operations, as will be described.

The computing system 604 further include a source manager 620. The source manager 620 can be responsible for obtaining documents, including in some cases extracting data from the documents. The source manager 620 can include one or more source adapters 622, shown as 622*a*, 622*b*. A source adapter 622 is configured to extract data from a particular source type, which can include formatting the data, or removing formatting from the data. Consider a document produced by a word processor. The document can include text, as well as formatting information for the text, such as field codes, font styles, or spacing information. A source adapter 622 can be configured for the document type produced by the word processor, which can parse the document to extract text while removing non-text information. Similarly, a source adapter 622 can be configured to extract data from database tables, JSON documents, or webpages.

A source adapter 622 can be configured to implement an interface INTERFACE extract (PARAMETER Source f) RETURNS ONE OF [RDF, String].

The source manager 620 can access a source store 626. The source manager 620 can retrieve documents from the source store 626, such as for processing the documents with a source adapter 622. The source manager 620 can also cause text extracted from sources to be saved in the source store 626.

A user, such as of the client 608, can cause the source manager 620 to perform various actions, such as through the user interface 612. For example, a user can cause documents to be loaded into the source store 626, and can request that particular documents be processed by a source adapter 622, or to create groupings of sources in the source store (such as a grouping of sources that are believed to represent related instances that are to be used in extracting properties for an ontology).

The computing system 604 include a graph generator 632. The graph generator 632 can perform at least portions of operations 520 of the process 500 of FIG. 5. The graph generator 632 can include functionality that implements named entity recognition and relationship extraction. The graph generator 632 can have access to the source store 626, and can store graph information, such as storing triples in an interim triples store 636.

A matching executor 644 can access the interim triples store 636, and identify properties that are the same, but referred to using different terminology, as in the operation 530 of the process 500. In some cases, mappings may already exist between different schemas, and prior mappings can be retrieved from a mapping memory 648, which can reduce the time and computing resources needed to perform a matching process. Matching results produced by the mapping executor 644 can be stored in a triples store 660. The triples store can also store triples associated with a list of properties identified as a result of the process 500.

Example 6—Example Sources for Use in Property Identification

FIG. 7A-7C illustrate example sources, such as sources from which text can be extracted. The sources of FIG. 7A-7C provide information for one or more car models, where a given car model, for example, can represent an instance of a car, and where a particular car instance can be described by one or more sources.

FIG. 7A illustrates a source 700 with a description with a car model "SE" produced by car company SAP. Note that the source 700 includes various keywords that can be recognized by a human as relating to properties of a car. However, the disclosed techniques provide ways that can automatic the creation of an ontology/property identification, including in ways that would not be performed by a human. For example, a human might review instance data for one or two car models and then use intuition to extract properties, such as for a car class. A human would not create instance graphs from individual sources, for example, or perform a matching process as described.

In FIG. 7A, examples of words that can be related to properties include "electric power," "vehicle," "plug-in," "hybrid," "kW," "hp," "fuel efficiency," "electric power consumption," "range," and "emissions." FIG. 7B illustrates another source 720 describing the SAP SE fictional car. Note that source 720 includes some words and properties that correspond to the words and properties used in the source 700. For example, the source 720 also includes words such as "kw," "hybrid," and "hp." The source 720 also includes words that are not present in the source 700, but which can be properties of a car, such as "gasoline engine" or "engine," "torque," "accelerates," "adaptive," "suspension," and "differential." Note that some of these words can indicate properties, while others can indicate property values. For example, "differential" can correspond to a "differential type" property, and "sport" can be an example literal value for "differential type."

FIG. 7C is similar to FIGS. 7A and 7B, having text for a source 730, where at least some of the text can correspond to properties (or literal values) also present in the source 700 or the source 720, where the terminology used for a property can be the same or different. The source 730 can include properties, or example literal values, that are not in the sources 700 or 720, and can omit properties or literal values that are in the source 700 or the source 720. For example, the source 730 does not include "differential," which was a term included in the source 720.

Figure 8:
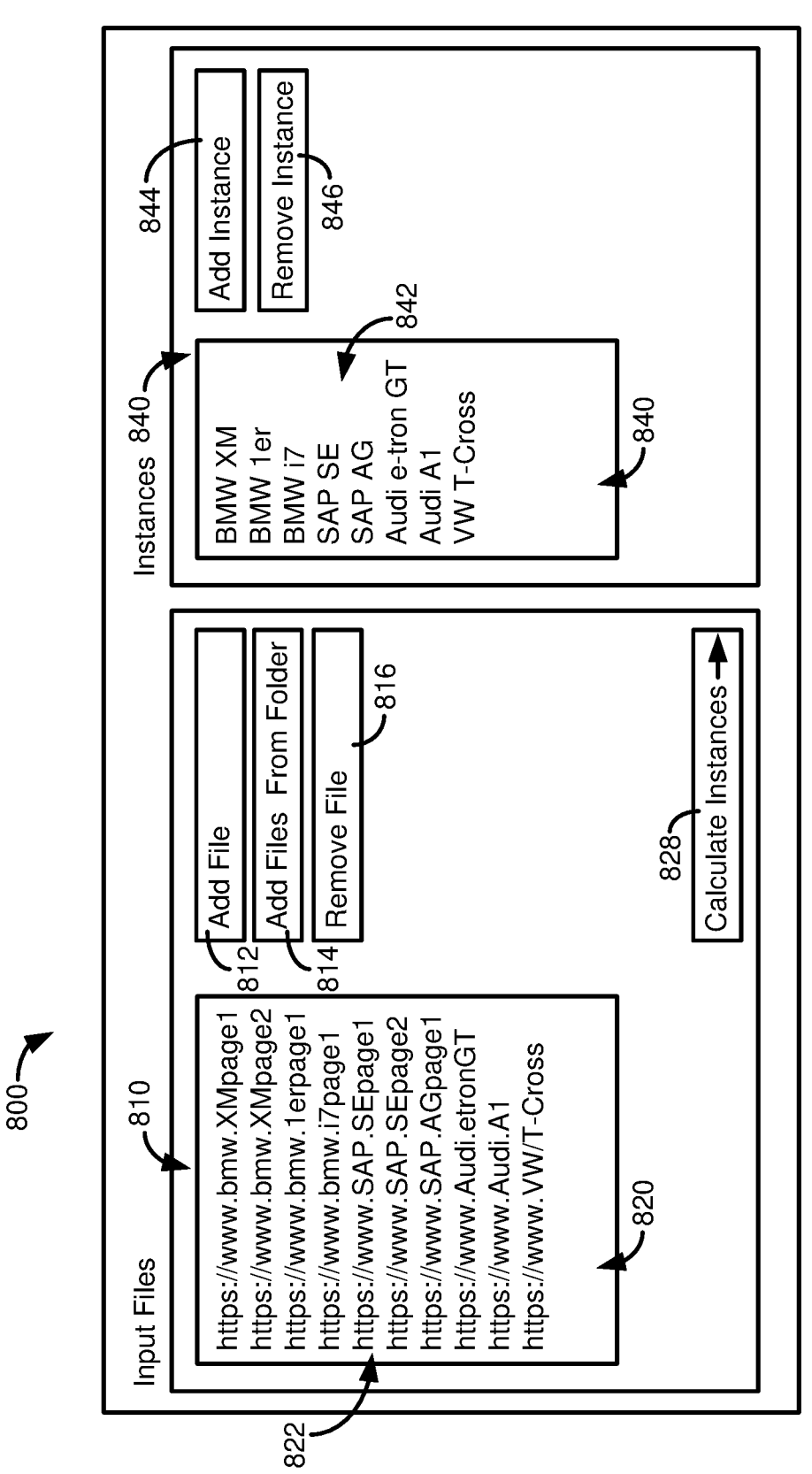
FIG. 8 illustrates an example user interface for selecting source files for analysis and for identifying instances associated with such source files.

Example 7—Example User Interfaces for Executing a Property Identification Process and Example Property Count and Alignment Processes FIG. 8 provide an example user interface 800 where a user can select source files to be analyzed, such as during the operation 510 of the process 500 of FIG. 5. In a panel 810 of the user interface 800, a user can select particular files to be analyzed, such as using a control 812 to add a file, a control 814 to add all files from a particular folder, or a control 816 to delete a particular file. A field 820 displays a list of currently selected sources, or input files, 822. Typically, a user may select files that are expected to contain instances, such as of one or more classes for which properties are to be extracted, such as for use in constructing an ontology.

The user interface 800 provides access to functionality that can be used to determine instances present in the files of the field 820 through a calculate instances control 828. For example, selecting the control 828 can cause instances to be identified that are present in the files 822 of the field 820. As discussed, multiple files may represent/describe a since instance.

Recognizing instances can be performed in a variety of ways. For example, the structure of the files 820 may be analyzed, such as to determine if there are common elements. In the example shown, the files 820 are identified by URLs, and the URLs have the form of an auto manufacturer name followed by a car model name. In other cases, determining instances can be based on various heuristics, such as by at least tentatively assigning files to a common instance based on a usage count of a term. For example, if "SE" is used many times in a file or set of files, it may be determined that "SE" may represent a particular car instance.

A panel 840 lists instances 842 associated with the input files 822. The instances 842 can be those obtained through automated analysis of content of the input files 822, or can correspond to instances added manually by a user. For example, a user may choose to delete an instance 842 using a remove instance control 844, or to add an instance using an add instance control 846.

Figure 9:
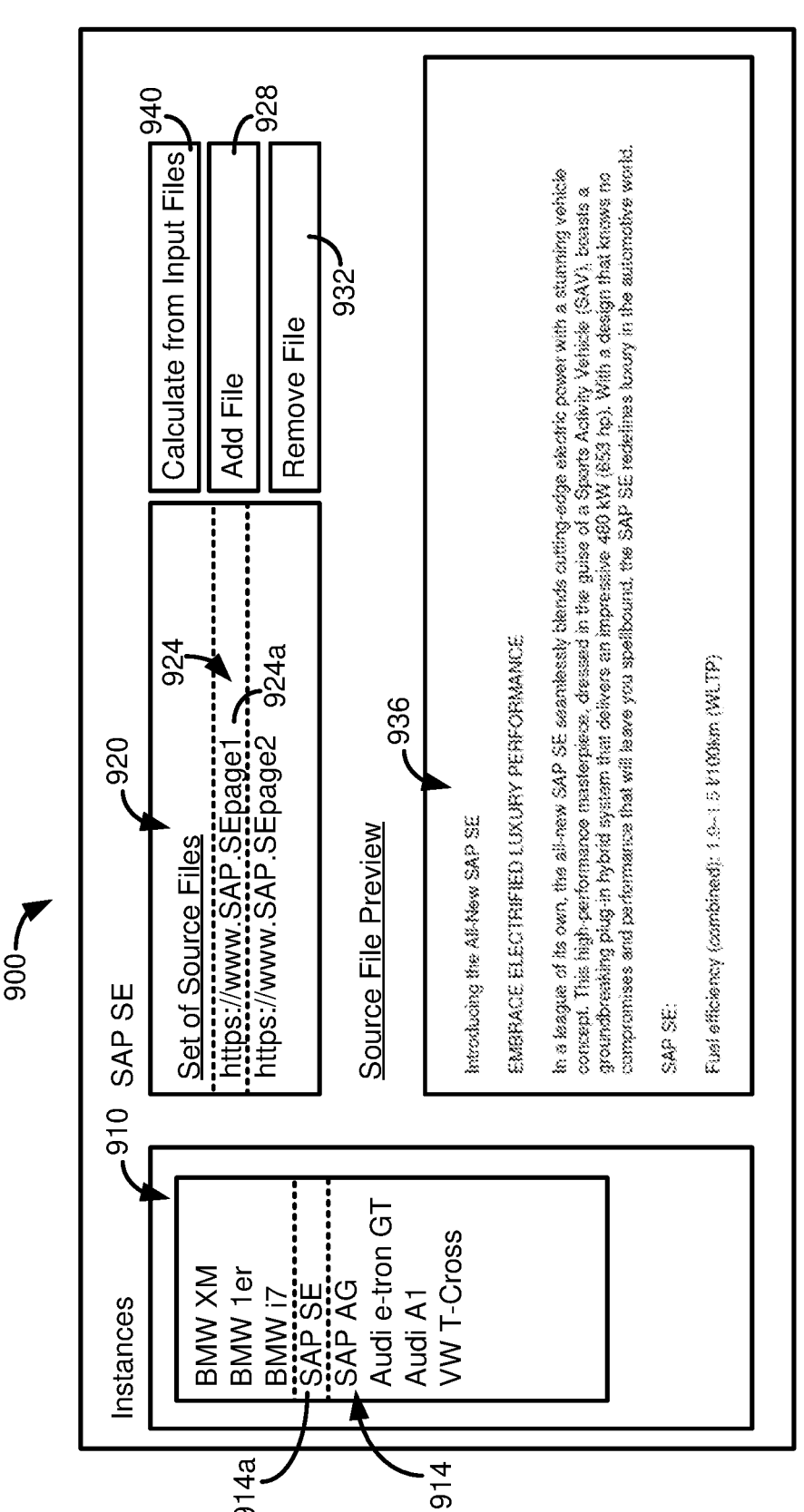
FIG. 9 illustrates an example user interface where a user can define or edit a set of source files for particular instances.

FIG. 9 provides a user interface 900 through which a user can initiate a knowledge graph discovery or update process, such as corresponding to actions performed during operation 510 of the process 500 of FIG. 5. The user interface 900 provides a panel 910 that lists instances 914 to be used in knowledge graph creation or update. The instances 914 can correspond to the instances 842 of FIG. 8.

A panel 920 lists input (or source) files 924 corresponding to a selected instance 914*a* of the instances 914. The input files 924 correspond to a portion of the input files 822 of FIG. 8. As noted, multiple input files 822 can describe the same instance 914. The user interface 900 can provide a control 928 allowing a user to add an input file to the set of files for the instance 914*a*, as well as a control 932 allowing a user to remove such a file. A panel 936 provides a preview of a selected input file 924*a* of the input files 924. The user can initiate a graph creation/update process for one or more of the instances 914 by selecting user interface control 940.

Figure 10:
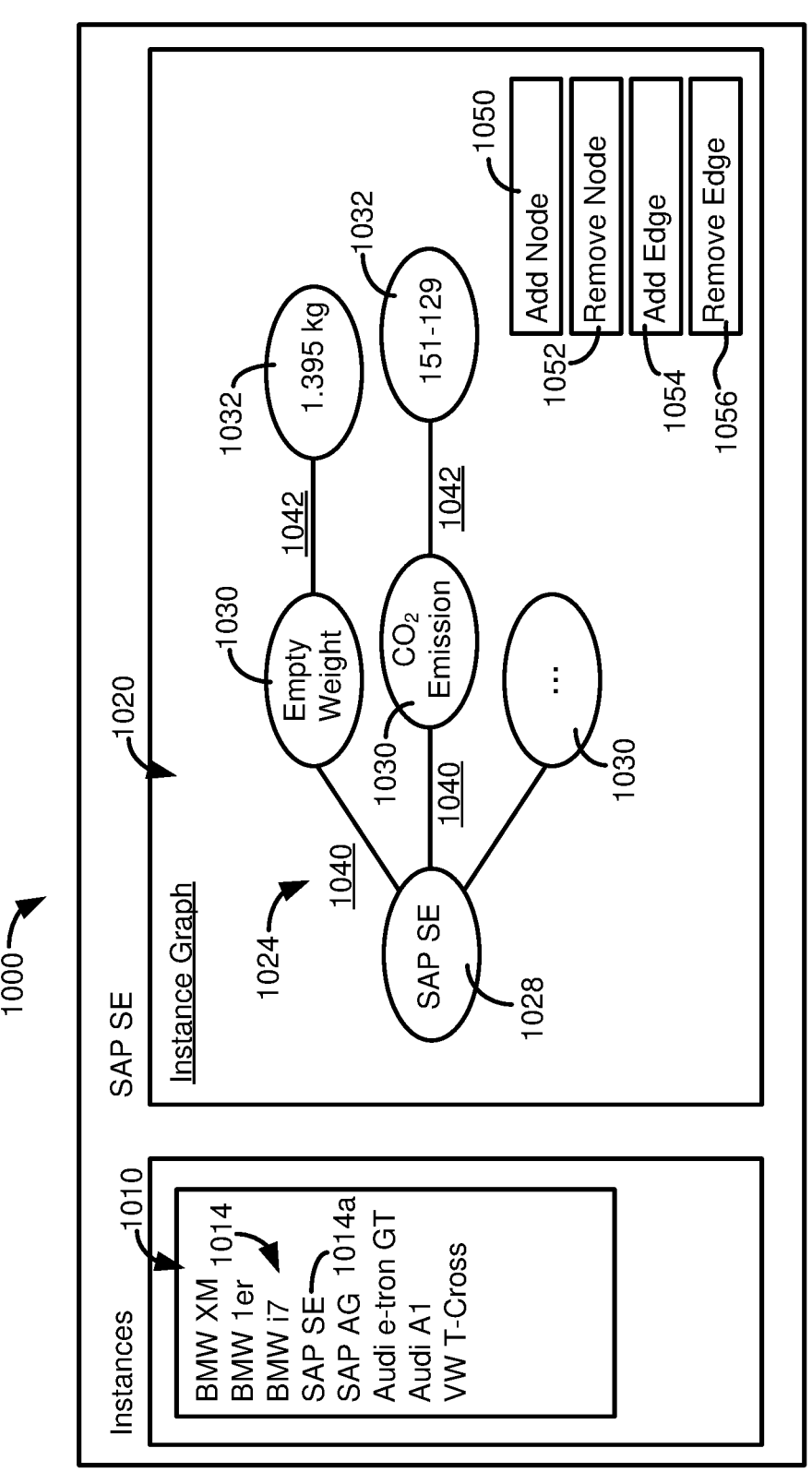
FIG. 10 illustrates an example user interface where a user can view and edit instance graphs created from one or more sources files for an instance, including viewing properties extracted from the source documents or property values.

FIG. 10 illustrates a user interface 1000 that allows users to view, and optionally modify, knowledge graphs determined after selection of the user interface control 940. A panel 1010 lists instances 1014 for which a knowledge graph was determined, and can correspond to the instances 914 of FIG. 9. A panel 1020 displaces instances graphs for selected instances 1014, such as an instance graph 1024 for instance 1014*a*.

The graph 1024 includes nodes and edges, where the nodes can correspond to an instance node 1028, property nodes, 1030, and literal value nodes 1032. Edges can represent relationships such as a node 1040 that indicates that an instance "hasProperty," or a node 1042 that a property "has Value."

Optionally, the user interface 1000 includes controls that can allow a user to modify a graph, as illustrated for the instance graph 1024. The user interface controls can include a control 1050 to add a node, a control 1052 to remove a node, a control 1054 to add an edge, or a control 1056 to remove an edge.

As described for operation 530 of FIG. 5, a matching process can be used to determining properties that are associated with different instances of a particular ontological concept. Mapping software functionality can implement an interface: INTERFACE match (GraphSet G) RETURNS Alignment.

Some properties can be common to all or a significant number of concept instances, while others may be less common, and some may even be specific to a single instance. In determining properties of an ontological concept, it can be useful to determine an occurrence frequency of particular properties. Typically, what is desired is to determine which instances have a property with the same semantic meaning, even if the term/label used for the property differs between instances.

FIG. 11 provides example pseudocode 1100 for performing instance alignment, and for counting a number of occurrences of a particular semantic property, regardless of the label applied. In a loop 1110, the pseudocode 1100 performs an alignment between a particular instance graph and a final graph being constructed for a set of instance graphs. In particular, line 1114 calls a "match" function that performs the alignment. In lines 1118, for properties in the instance graph being processed, if the property already exists in the alignment, a count for that property is incremented by one. If the property does not already exist in the alignment, its count is set to one.

Figure 12A:
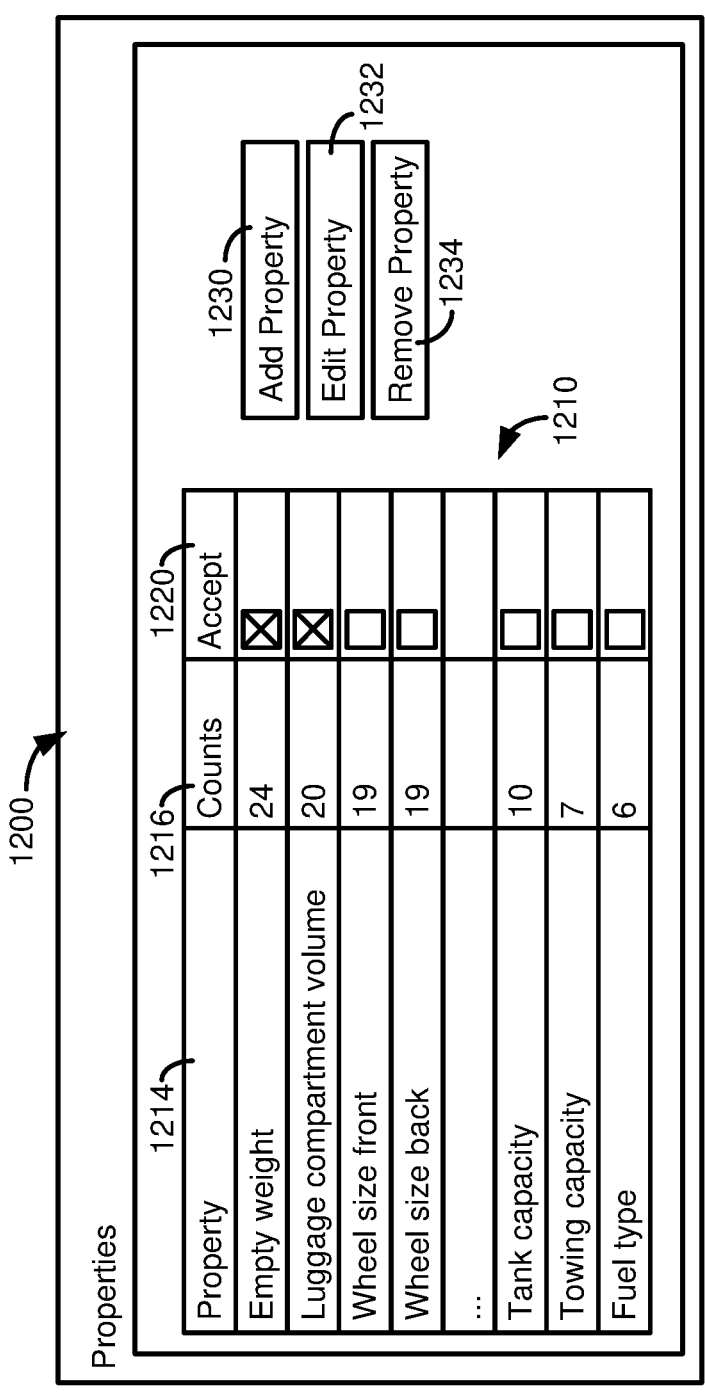
FIG. 12A illustrates an example user interface for viewing identified properties, as well as editing a list of properties and selecting properties to be included in an ontology.

FIG. 12A illustrates a user interface 1200 that presents results from a matching process for instance graphs, including property counts. The user interface 1200 includes a table 1210 that has a column 1214 for properties identified during a graph analysis and matching process, a column 1216 that indicates the number of times the property was observed in an instance graph, and a column 1220 that accepts user input as to whether a given property should be included in a "final" ontology generated from the instance data.

The user interface 1200 includes a control 1230 allowing a user to add a property, a control 1232 allowing a user to modify a property, and a control 1234 allowing a user to remove a property. Modifying a property can include changing a name/label applied to a property. That is, the name of the property in the column 1214 can be a property name that was automatically selected from the instance data. In a particular implementation, a default name is selected that corresponds to the name appearing most frequently in the instance data, or most commonly for a set of discrete instances (that is, counting a number of instances where the name is used at least once).

Figure 12B:
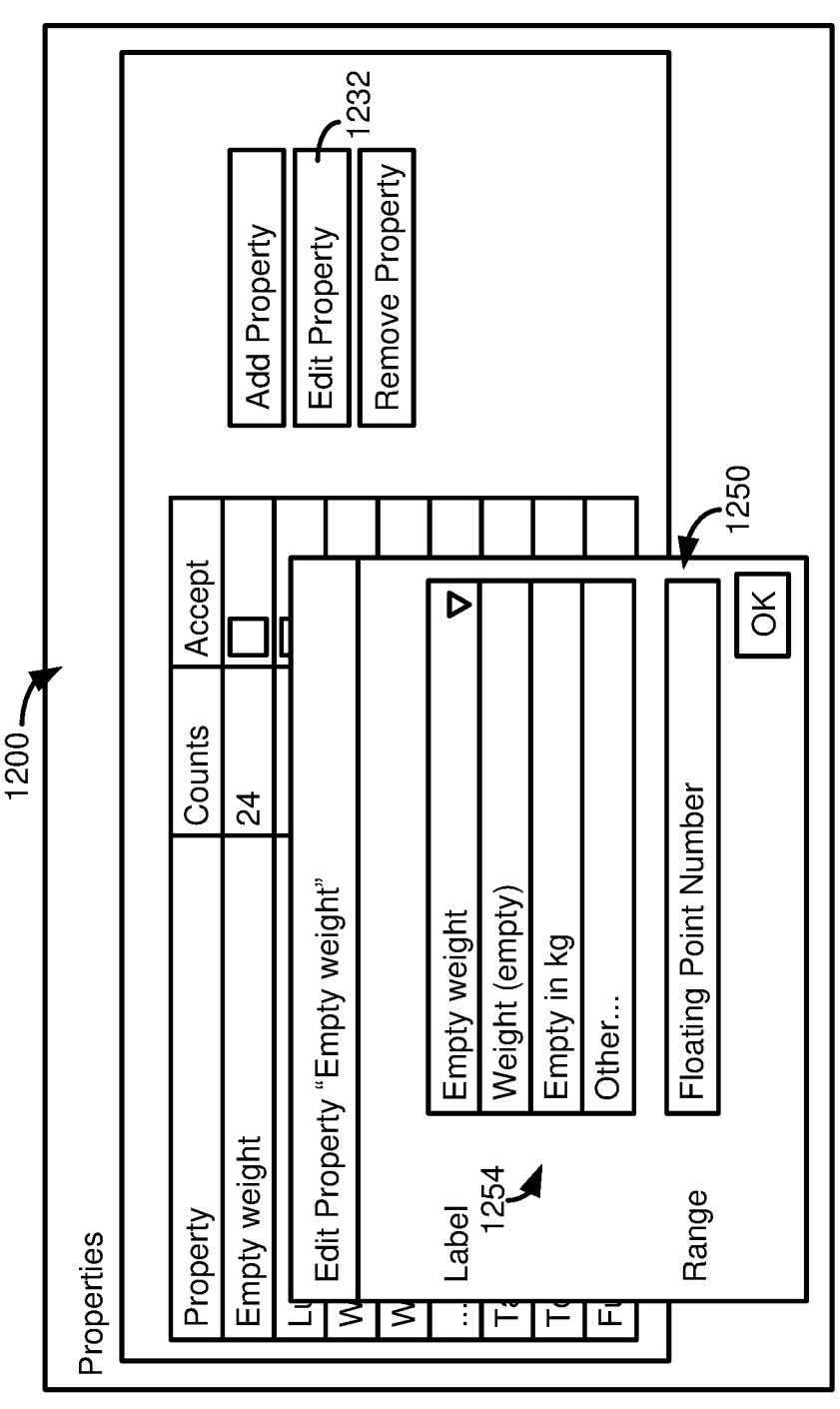
FIG. 12B illustrates the user interface of FIG. 12A after selection of a control to edit a property, such as a label applied to the property.

FIG. 12B illustrates the user interface 1200 after the selection of the control 1232. In this case, a window 1250 allows a user to select a name from a dropdown list 1254, where the options can correspond to names identified in the input set. A user may be allowed to enter a different property name that does not occur in the instance data. The window 1250 is also shown as including a field that illustrates the range (such as a datatype, and optionally a range or list of values observed in/consistent with the instance data).

In other implementation, instead of, or in addition to, having users add properties to an ontology, properties can be automatically added, including if they satisfy defined criteria. For example, a rule can be defined that a property will be added to a set (for an ontology, for example) if it occurs more than a threshold number of times in a set of instances, or occurs in a percentage of instances above a threshold amount).

Further, in some cases, a graph, such as the finalGraph defined in the pseudocode 1100 of FIG. 11, can be modified based on a final set of selected properties. For example, nodes that do not correspond to instances or to properties of the set of selected properties can be removed from the graph.

Example 8—Example Class Identification,
Including Interface for Providing Parameters for
Class Identification Process Disclosed techniques allow for automatic determination of classes, including hierarchical arrangements of classes, using instance data, knowledge graphs based on instance data, and properties associated with the instance data. While the instance data, knowledge graphs, and properties are not limited to any particular source, in some implementations the techniques described in Examples 3-7 can be used to select a pool of data, such as input files, that have information regarding instances, determine instances from the input data, create knowledge graphs for the instances, and extract properties of the instance data, including by mapping different labels used to refer to the same semantic property.

Figure 13:
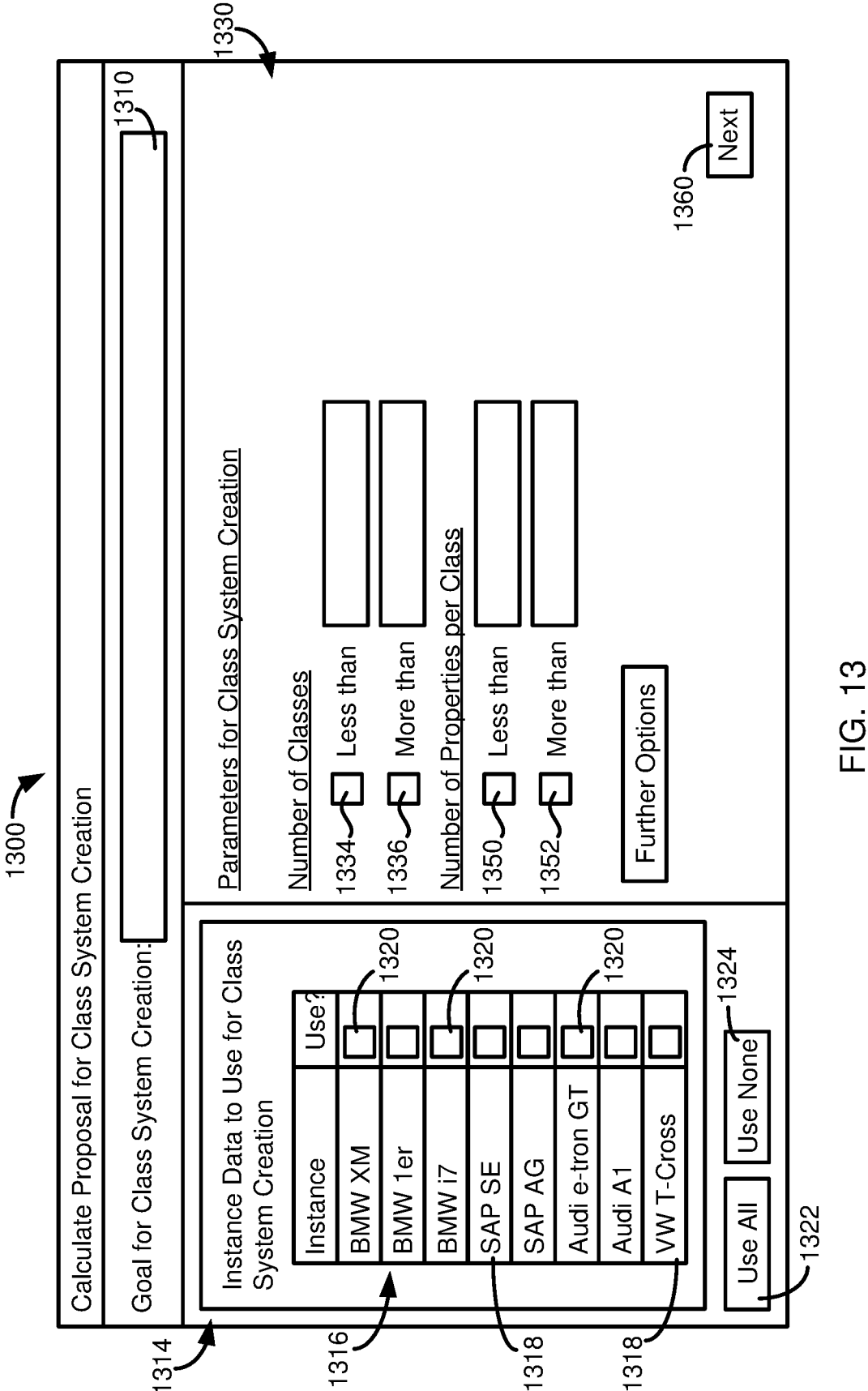
FIG. 13 illustrates an example user interface where a user can define a set of instances to be used in class identification, as well as parameters to be used in an identification process.

FIG. 13 illustrates an example user interface 1300 where a user can select parameters for a class discovery process. A user can provide notes for a given instance of the process in a field 1310, such as recording a goal or reason for creating a classification system. A panel 1314 displays instances 1316 that are available for use in the class discovery process. In addition to a name 1318 of an instance 1316, the panel 1314 provides controls 1320 that a user can use to indicate whether a particular instance will be included in the analysis.

The instances 1316 can correspond to the instances 914 of FIG. 9. A control 1322 allows a user to select all instances for use, while a control 1324 results in deselection of all instances.

A panel 1330 of the user interface 1300 allows users to select parameters for use by a class discovery algorithm. A class discovery algorithm, as will be further described, can include various techniques for forming communities (also referred to as clusters or groups) of instances. It may be desirable to limit the class discovery process, such as to a maximum number of classes, which can be set using a control 1334, or to set a minimum number of classes, which can be set using a control 1336.

Classes can be hierarchically arranged. That is, for example, a given class may have one or more subclasses, and in turn those classes may have one or more subclasses. Although not shown in FIG. 13, a user can be provided with controls to select parameters such as a minimum or maximum depth to be used for a given class and its subclasses or minimum or maximum numbers of "base" classes or classes otherwise at a given hierarchical level. For example, a parameter could be set to define a minimum of three base classes, and a maximum of five subclasses (at the same or a different hierarchical level) for a given base class. In another example, a maximum or minimum number of classes (including subclasses) are set, and other properties/parameters can be used to determine how those limits should be applied, such as using various scores that determine a difference between clusters (that is, the algorithm may favor defining classes using clusters having lower degrees of relationship, if otherwise a number of identified clusters would exceed a threshold). Similarly, in general, the class discovery algorithm can include parameters (which may or may not be user modifiable) as to when classes will or will not be created.

In a similar manner as described for setting a number of classes, controls 1350, 1352 allow a user to set a maximum or minimum number of properties to be included in each class. A user can initiate the class discovery algorithm using a control 1360.

Example 9—Example Class Identification Process

Figure 14:
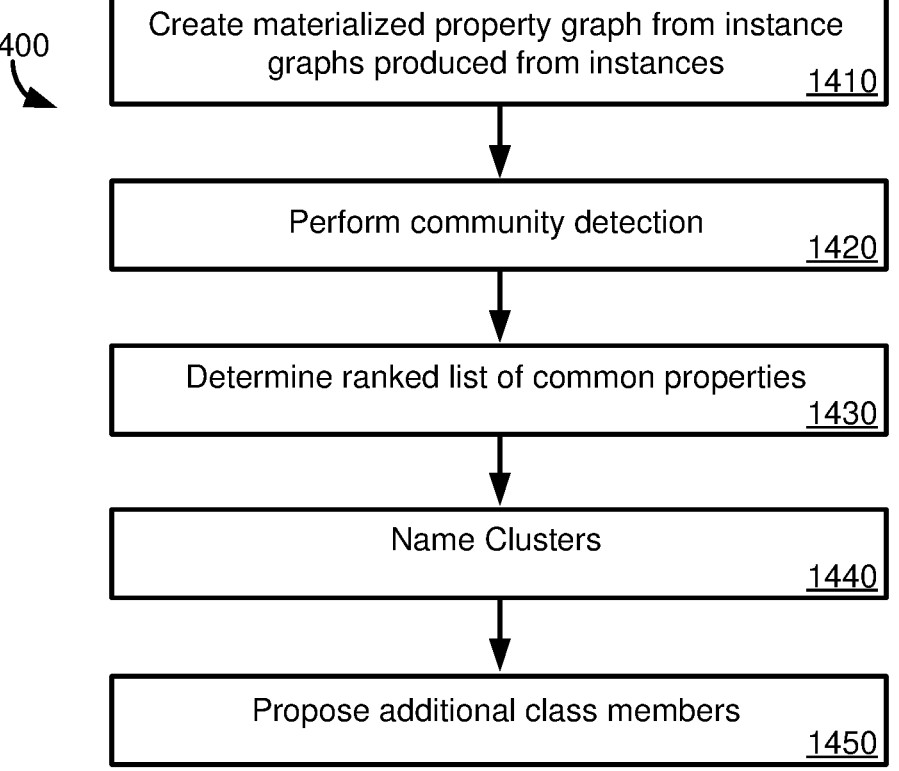
FIG. 14 is a flowchart of an example class identification process.

FIG. 14 provides a flowchart of a process 1400 for extracting classes from a set of instance data. The details of the various operations in the process 1400 will be further described as the specification proceeds.

At 1410, a materialized property graph is created from instance graphs produced from various instances, such as instances of a particular ontological concept (and for which one or more classes may be eventually identified using the process 1400). A materialized property graph can be a graph that combines information from multiple instances, including, in at least some cases, using an aligned set of properties (such as described in Example 7). The materialized graph differs from traditional knowledge graphs, such as those expressed in RDF, in that it has property information expressed as graph nodes, rather than as edges. The materialized graph is used in a community (or clustering) process at 1420 to provide suggested classes (corresponding to discrete communities or classes).

As will be described, class discovery can be based at least in part on common properties, where some properties may be more commonly occurring in class instances than in others. A ranked list of common properties is prepared at 1430.

Optionally, proposed cluster names are determined at 1440. Proposed classes can be presented to a user, including information about ranked properties and property names. Once a user has confirmed class definitions, additional class members can optionally be proposed at 1450. For example, there may be a large set of instance data, and a subset of such data can be used to determine classes. Once the classes are defined, the remaining data in the set of instance data can be processed and assigned to classes using the class definitions. Similarly, the class definitions can be used to classify new instance data as it is received.

Example 10—Example Generation of Materialized Graphs for Use in Class Identification FIGS. 15-18 illustrates typical knowledge graph structures and their corresponding materialized knowledge graph equivalents.

Figure 15:
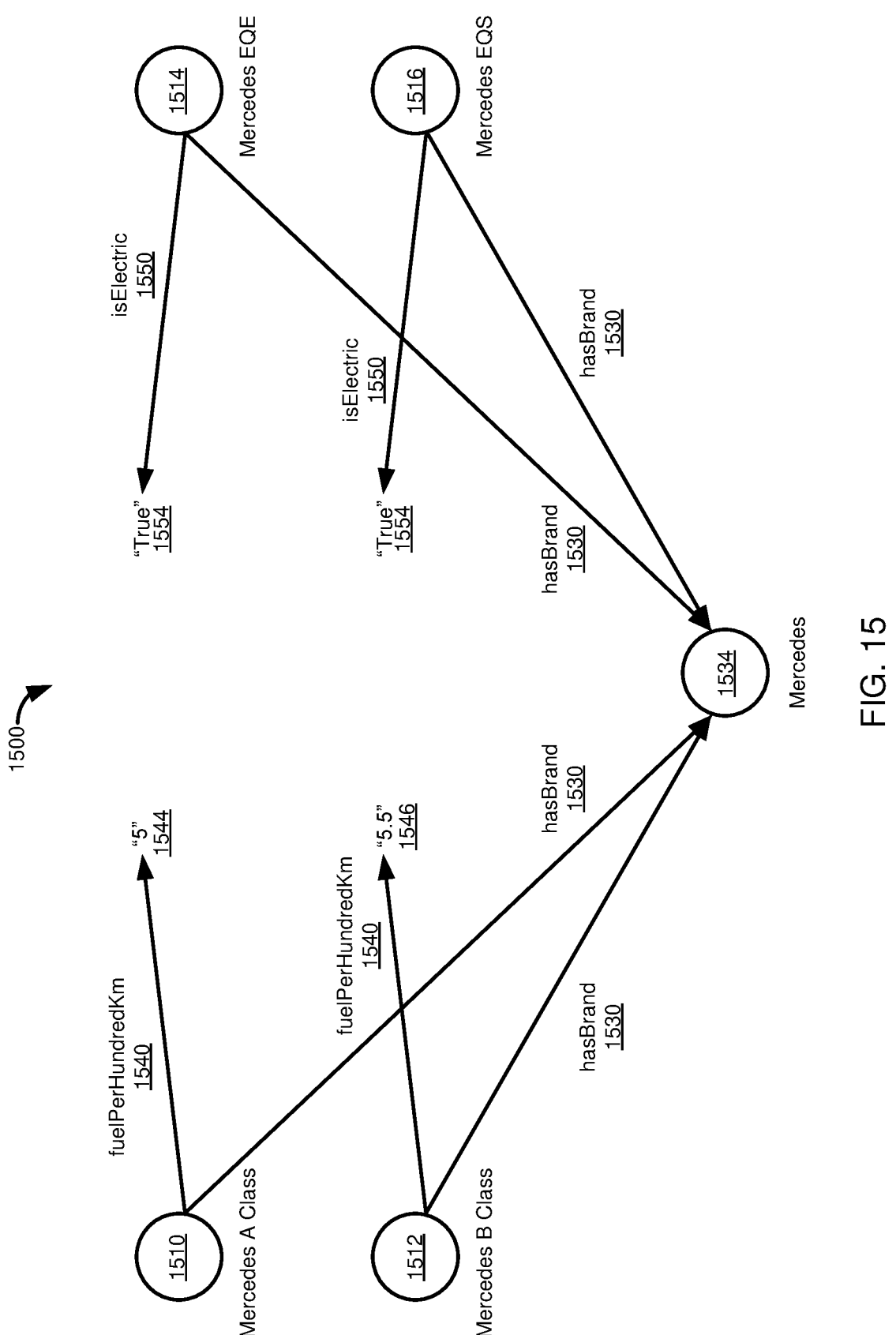
FIGS. 15 and 16 illustrate example instance graphs, where a given graph includes triples (such as RDF triples) for multiple instances, where the instances are useable in a class detection process.

FIG. 15 illustrates a graph 1500 that includes information related generally to vehicles. For purposes of this example, that the graph 1500 relates to vehicles is assumed as known for purposes of describing disclosed innovations. However, in practice, classes, or at least certain classes, that are present in the graph 1500 may not be initially known. Rather, a set of instances can be provided without any class information, and the class information with be obtained using disclosed techniques. The graph 1500 is similar to the instance graph 1024 of FIG. 10, and be considered as a combined instance graph for multiple instances.

The graph 1500 includes nodes 1510, 1512, 1514, 1516 that correspond to different vehicle instances. Vehicle instances 1510-1516 are shown as having edges 1530 representing a "hasBrand" property, where in this example all of the instances are connected to the same brand, represented by node 1534. Instances 1510, 1512 and 1514, 1516 are shown as having different properties. Instances 1510, 1512 have a "fuelPerHundredKm" property, represented by edges 1540, where they are connected to respective literal values 1544, 1546. On the other hand, instances 1514, 1516 have an "isElectric" property, represented by edges 1550, which are connected to the same literal value 1554 of "true."

Figure 16:
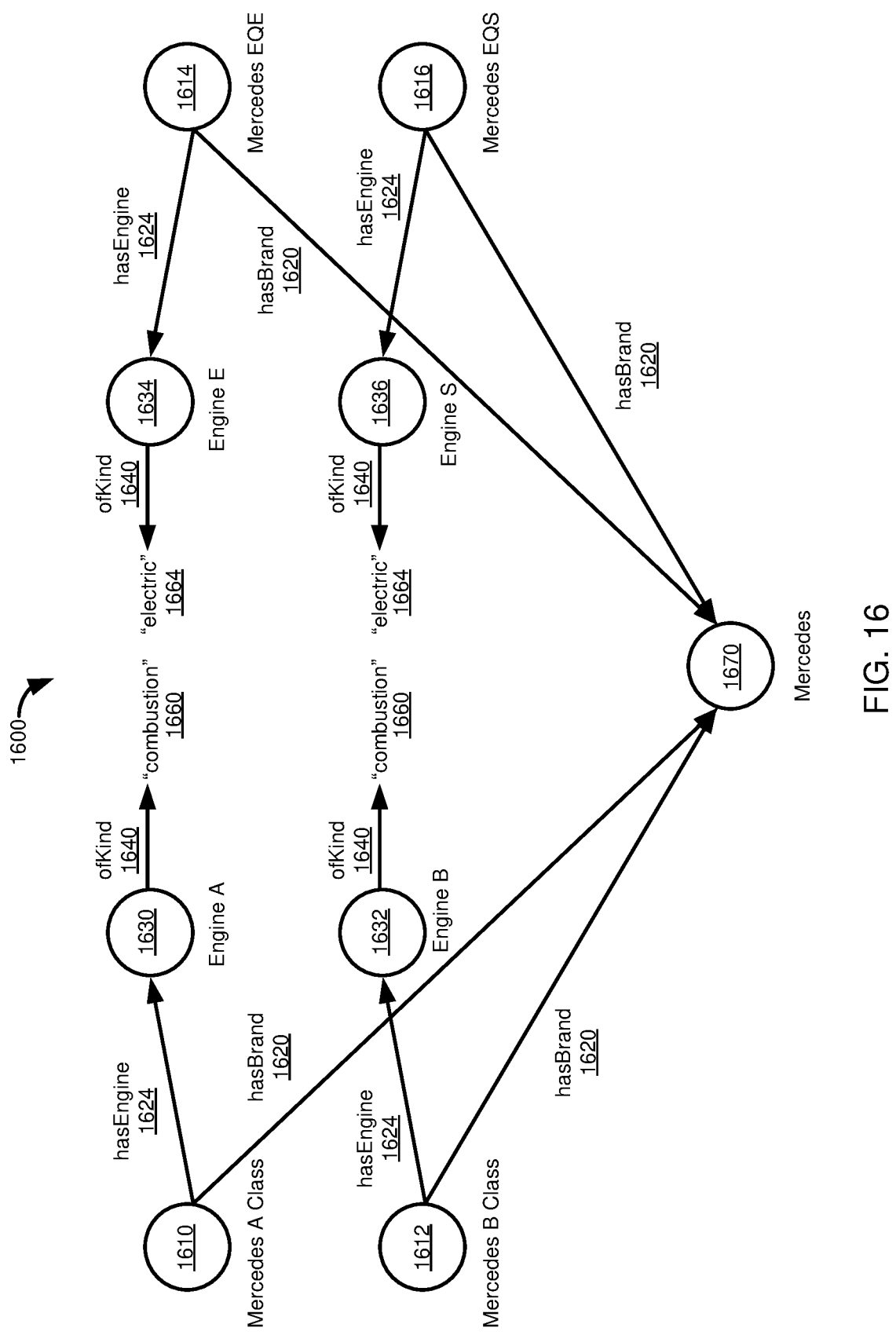

FIG. 16 illustrates another graph 1600 that includes information related generally to vehicles. The graph 1600 is presented as a somewhat more complex example than the graph 1500, including how there can be nodes located at greater distances/hops from other nodes.

In this case, there are nodes 1610, 1612, 1614, 1616 for particular instances (in this case, car models). A given instance can have various properties (which can correspond to predicates in graph triples expressed in subject, object, predicate format). In particular, all of the instances 1610, 1612, 1614, 1616 have a "hasBrand" property, indicated by edges 1620, and have a "hasEngine" property, indicated by edges 1624. Note that objects 1630, 1632, 1634, 1636 connected to the instances 1610-1616 by the edges 1624 are of different types (representing different engine types). In turn, the objects 1630-1636 have an "ofKind" property, indicated by edges 1640. The edges 1640 connect an object of the objects 1630-1636 to particular literal values, in this case a literal value 1660 for "combustion" type or a literal value 1664 for "electric" type.

The edges 1620 connect the nodes 1610-1616 to a single object, node 1670, representing the brand "Mercedes."

Figure 17:
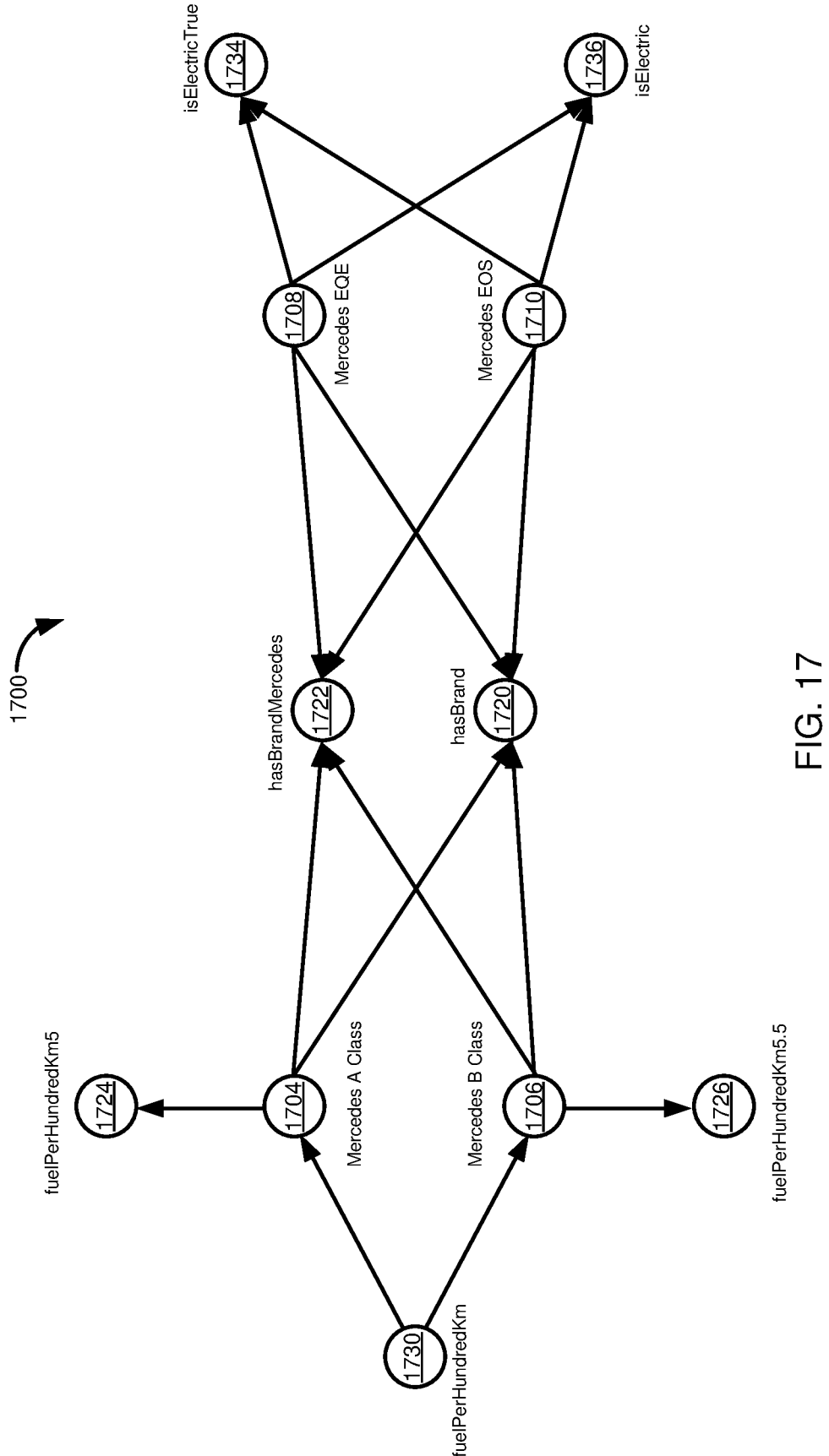
FIGS. 17 and 18 illustrates "materialized" versions of the graphs of FIGS. 15 and 16, where property information of the graphs of FIGS. 15 and 16 has been materialized as nodes in the materialized graphs of FIGS. 17 and 18.

In FIG. 17, graph 1700 corresponds to a modified version of the graph 1500, where property information has been "removed" from edges to instead be represented as nodes. The graph 1700 includes nodes 1704, 1706, 1708, 1710 that correspond to nodes 1510, 1512, 1514, 1516 of FIG. 15. Rather than the "hasBrand" edges 1530 of FIG. 15, the graph 1700 includes a node 1720 representing the "hasBrand" property. In addition, the object 1534 has been concatenated with the "hasBrand" property to provide a node 1722. In a similar matter, the literal values 1544, 1546 have been concatenated with the "fuelPerHundredKm" property in respective nodes 1724, 1726 of FIG. 17, while a node 1730 represents the "fuelPerHundredKm" property itself. The literal value of "True" 1554 of FIG. 15 has been concatenated with the "isElectric" property of FIG. 15 and represented as node 1734, while the "isElectric" property is represented by node 1736.

Note that the graph 1700 allows commonalities of the nodes of FIG. 17 to expressed in a way that can be more "visible," and useable by a computer, than the graph 1500. That is, FIG. 17 more clearly captures that all of the instances are of brand Mercedes, as well as possessing the "hasBrand" property.

Figure 18:
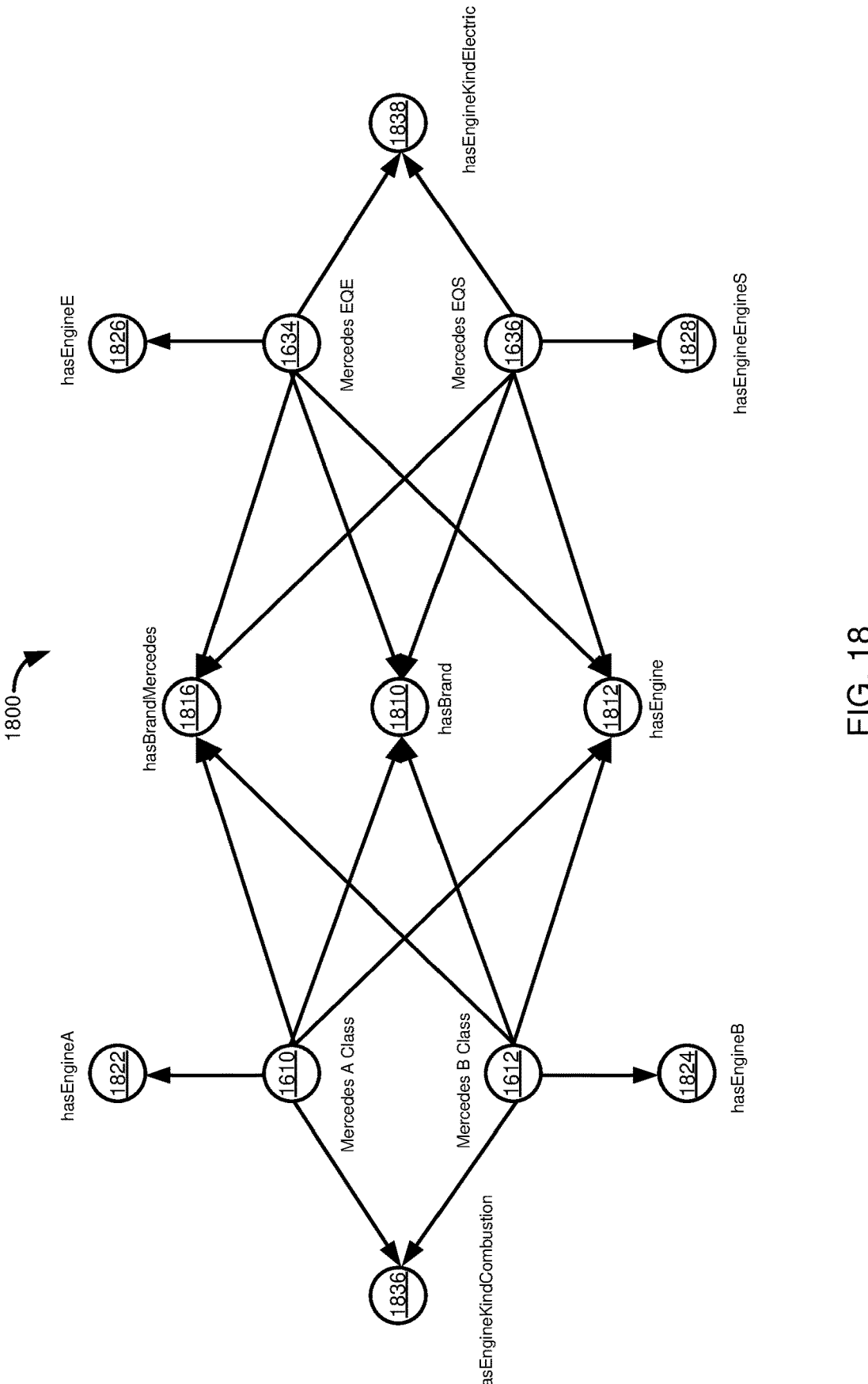

A materialized graph 1800 of FIG. 18 can be produced from the graph 1600 of FIG. 16 in a similar manner as the materialized graph 1700 was produced from the graph 1500 of FIG. 15. As with the graph 1700, the graph 1800 is formed by introducing nodes for properties represented as edges in the graph 1600, and by concatenating literal/object values as nodes for a given source node in the graph 1600. For example, the "hasBrand" and "hasEngine" properties of FIG. 1600 are represented, respectively, by nodes 1810, 1812. The combination of the "hasBrand" relationship and the object "Mercedes" is represented by node 1816. Objects 1630-1636 are concatenated with the hasEngine engine edges to provide nodes 1822, 1824, 1826, 1828. Similarly, the literals 1660, 1664 have be concatenated with both the "ofKind" relationship (edges 1640) and the "hasEngine" relationship (edges 1624) to provide nodes 1836, 1838. As will be seen, generating a materialized graph, including representing property information as nodes, can allow community detection techniques to be applied to determine classes present in a given materialized graph.

Example 11—Example Pseudocode for Graph Materialization

FIG. 19 provides example pseudocode 1900 for generating a materialized knowledge graph, such as the graphs 1700 and 1800 of FIGS. 17 and 18. In the pseudocode 1900, a buildMaterializedPropertyGraph function 1904 has parameters of instances I in an input graph G, where the graph G can be, for example, the graph 1500 of FIG. 15 or the graph 1600 of FIG. 16. The function 1904 also includes a depth factor as a parameter, the purpose of which will be further described. The pseudocode 1900 initializes a materialized graph G' that is defined using the function 1904, and sets a current depth value to 1. The pseudocode 1900 then defines a WHILE loop 1920 that executes until the current depth value is less than the depth value received as an argument to the function 1904.

The loop 1920 includes a condition that evaluates whether the current depth is equal to one, where operations 1924 are carried out if the condition is met, and operations 1926 are carried out otherwise. The operations 1926 define a loop 1930 that is defined based on triples (subject, object, predicate) in the input graph G, where the number of iterations of the loop is based on subjects represented in the triples. It is determined whether a particular subject is part of the set of instances provided for the corresponding parameter I of the function 1904. If the subject is in the set of instances, a set of paths is defined based on triples from the graph G, where a path is based on a given subject, the input graph G, and a current depth being processed by the loop 1920. A path can be, for example, a path between the subject of a triple and object nodes or literals within a distance of the subject equal to a current depth being analyzed.

Identified paths are added to the materialized graph G' in the form of nodes having a label corresponding to concatenated property types and the object (or literal) to which the subject is connected. For example, the graph 1600, corresponding to the graph G, of FIG. 16 includes the literal values 1660, 1664 that are located two hops away from the instances 1610-1616. In FIG. 18, these relationships are represented by nodes 1836, 1838, which include the properties hasEngine (edges 1624) and ofKind (edges 1640) along the path connecting the nodes 1610-1616 in FIG. 16 to the literal values 1660, 1664, along with the literal values themselves. Note that the nodes 1838, 1838 do not include intermediate objects, such as those corresponding to nodes 1822-1828.

In the operations 1924, carried out once the current depth is equal to one, triples in the graph G are again processed. In this case, if a subject is in the set of instances, two nodes are added to the materialized graph G'. One node corresponds to the property (relationship) type, connected to the relevant instance, such as nodes 1810, 1812 of FIG. 18. The other node corresponds to the concatenation of the property and the connected object or literal, such as node 1816.

Although edges between nodes in the materialized graph G' can optionally be added, such as to assist in interpretation, G' can be considered as an unlabeled graph, allowing known community detection techniques to be used.

Example 12—Example Generation of Subgraphs from Materialized Graphs

According to the process 1400 of FIG. 14, once a materialized graph has been generated, the materialized graph can be processed, such as by generating subgraphs. In a particular example, subgraphs can be generated by removing particular nodes from the materialized graph. For example, a betweenness score can be calculated, and nodes having highest betweenness scores can be removed from the graph to create one or more subgraphs, where the subgraphs can correspond to particular classes. The process can be repeated for the subgraphs, which can identify subclasses of the classes.

The disclosure proceeds with an example of community detection using node betweenness calculations. However, disclosed innovations can be used with other community detection techniques, such as those using edge betweenness or using modularity maximization, spectral clustering, infomap, label propagation algorithm, hierarchical clustering, or neural network approaches.

In a particular implementation, betweenness centrality can be calculated for nodes using:

$$C_B(i) \sum_{j<k} g_{jk}(i)/g_{jk}$$

where j and k are nodes in the graph different from a node i, $g_{jk}$ is the total number of shortest paths from node j to node k, and $g_{jk}(i)$ is the number of those paths that pass through node i.

Figure 20:
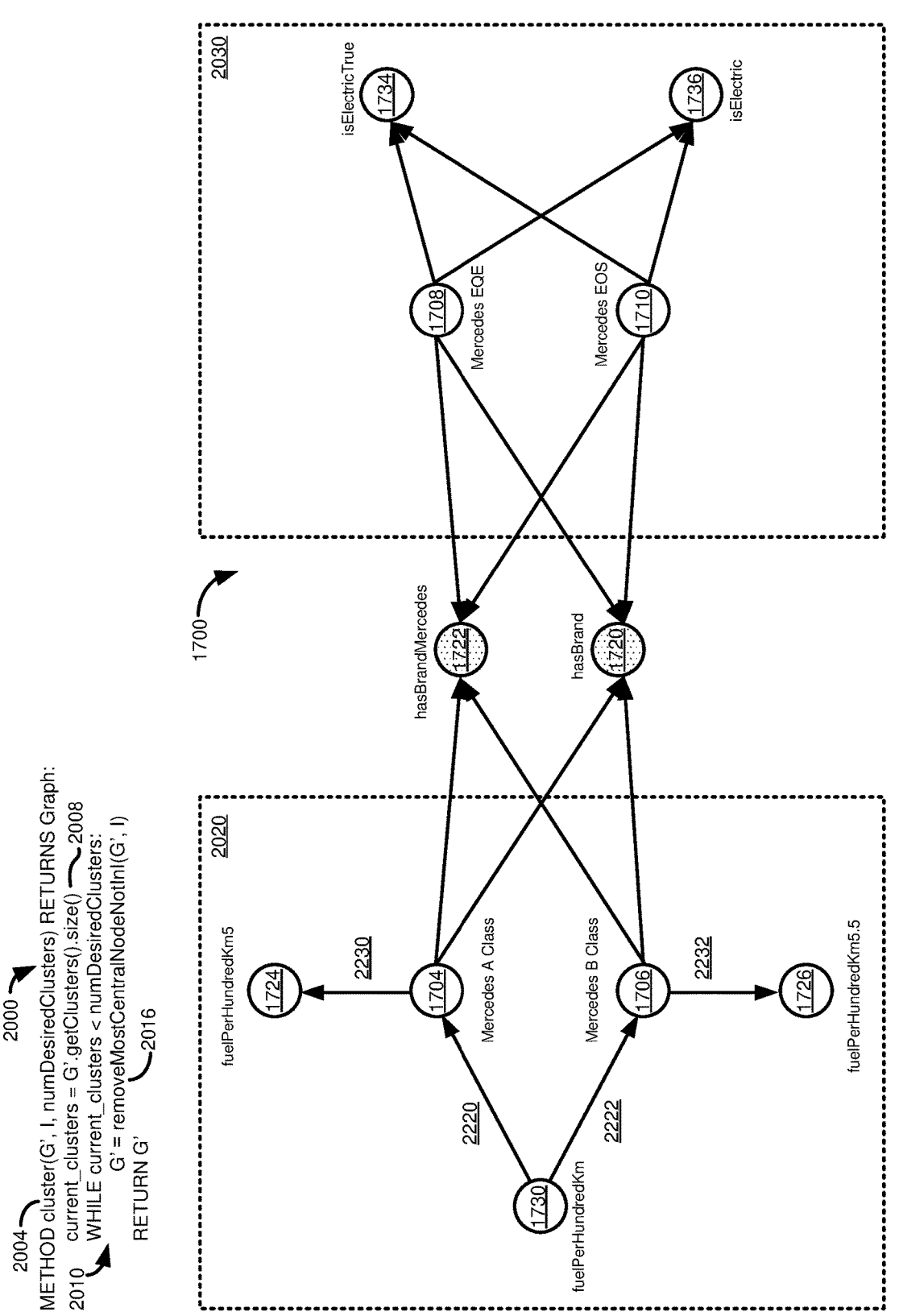
FIGS. 20 and 21 illustrates how subgraphs can be identified in the materialized graphs of FIGS. 17 and 18, such as by removing nodes satisfying a threshold "betweenness" value.

FIG. 20 illustrates example pseudocode 2000 for a community detection technique. A method 2004 takes as parameters the materialized graph G', the instances I, and a number of desired clusters. The pseudocode 2000 determines at 2008 a number of clusters currently in the materialized graph G'. The pseudocode 2000 then enters a loop 2010 where a most central node not in the instances is removed until a current number of clusters is less than the desired number of clusters. The loop 2010 calls a removeMostCentralNode-NotInI function 2016, which takes the materialized graph and the set of instances as parameters.

FIG. 20 illustrates the application of the betweenness centrality technique to the graph 1700 of FIG. 17, such as using the pseudocode 2000. Assume in this case that nodes 1720 and 1722 were determined to be the most central nodes, and are removed from the graph 1700, as indicated by the shading of the nodes. The graph 1700 is then split into two subgraphs 2020 and 2030. It can be seen that the subgraphs 2020, 2030 correspond to different classes (or communities or clusters), where subgraph 2020 corresponds to internal combustion engine cars and subgraph 2030 corresponds to electric cars. Thus, application of the disclosed techniques resulted in automated class identification without human application of semantic principles.

Figure 21:
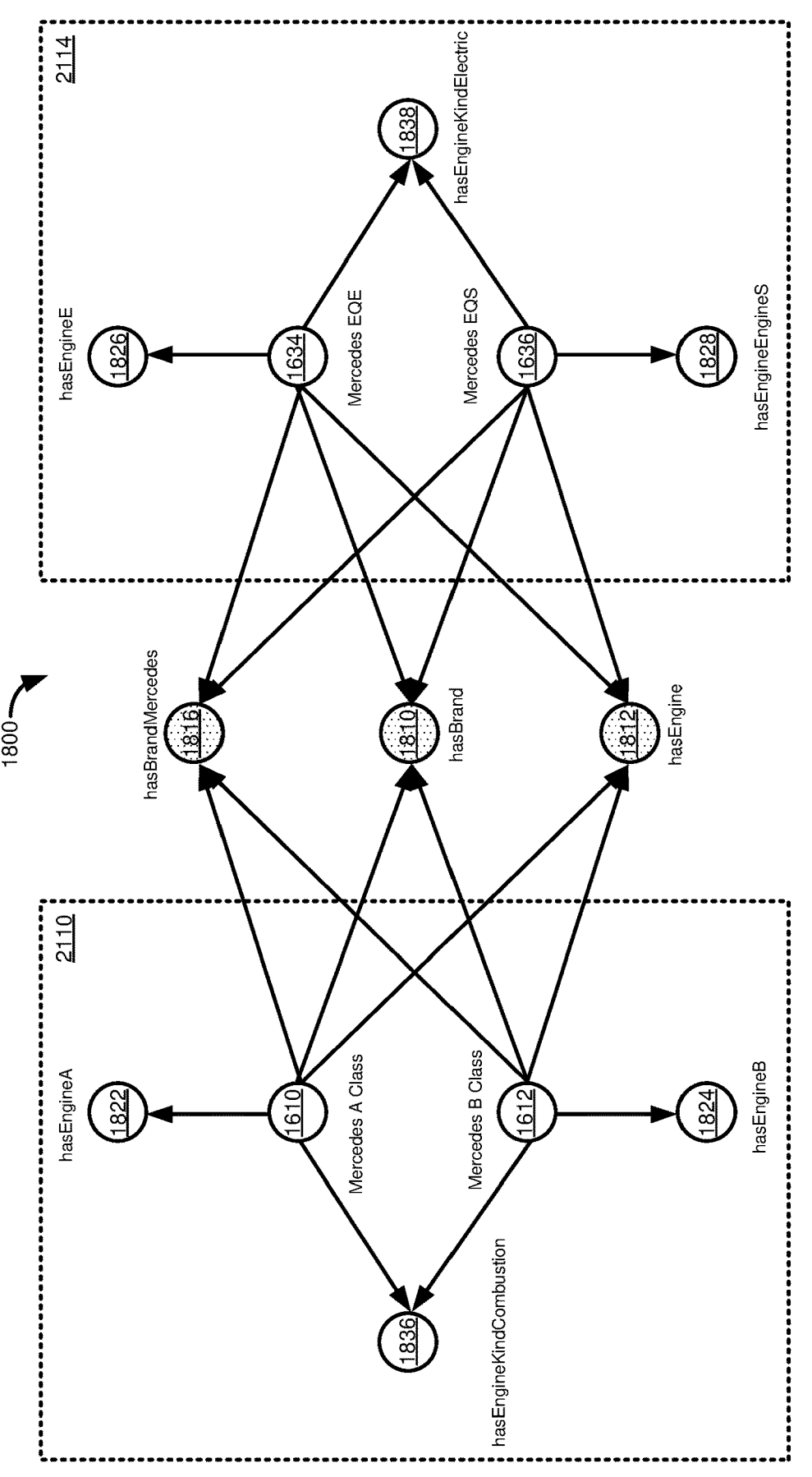

FIG. 21 illustrates the application of the betweenness centrality technique to the graph 1800 of FIG. 18, such as using the pseudocode 2000 of FIG. 20. In this case, assume that nodes 1810, 1812, and 1816 were determined to be the most central nodes, and are removed from the graph 1800, as indicating by the shading of the nodes. The graph 1800 is split into subgraphs 2110, 2114, where, as with FIG. 20, subgraph 2110 corresponds to cars with internal combustion engines and subgraph 2114 corresponds to cars with electric engines.

It should be noted that while a use case has been described that identifies class and subclasses, disclosed techniques can also be used to identify super classes. For example, consider that a set of classes (which can include subclasses) has already been defined for a set of instances. The information for the instances, optionally including existing classes and class definitions, can be used as input to produce a materialized graph, as has been described. The subsequent analysis of that graph can identify classes at a higher level than existing classes, including those that embrace multiple of the originally identified classes, which thus serve as super classes.

Example 13—Example Subgraph Property Analysis

Once clusters/subgraphs are identified, such as described in Example 12, components of the subgraph can be analyzed to help determine what components have the strongest correlation with the class. In this case, components can refer to properties, as well as particular property values.

While the present disclosure is not limited to a particular ranking technique, in a specific example, a ranking value can be calculated as:

$$cs_{cn} = \frac{|i_{nc}|}{|I_c|}$$

where $cs_{cn}$ is the cluster score of a non-instance node in a graph, $i_{nc}$ is the in-degree of the node within the graph (how many edges are directed towards node n), and $I_c$ is the number of instances in the cluster.

FIG. 22 illustrates how cluster scores can be calculated for the subgraph 2020 of FIG. 20. In this case, the non-instance nodes in the subgraph are 1724 (fuelPerHundredKm), 1726

(fuelPerHundredKm5), and 1730 (fuelPerHundredKm5.5). The results of the analysis are presented in table 2210. For node 1730, it can be seen that this node has two incoming edges 2220, 2222. Given that there are two instances in the subgraph 2020, the cluster score of node 1730 is 2/2=1. For nodes1724 and 1726, each node has a single incoming edge (edges 2230, 2232, respectively), and so each node as a cluster score of ½=0.5.

The results in the table 2210 comport with intuition, where it may be expected that fuel efficiency might be a characteristic of vehicles, but that having a particular level or value for that property might not be a characteristic of vehicles, even for vehicles with internal combustion engines.

As mentioned, however, the cluster definition and analysis process can continue, in some cases, for multiple "levels," such as by identifying further subgraphs of a given subgraph. In those situations, properties that might not have been sufficiently common enough to be a strong class characteristic might instead be a strong characteristic of a subclass. For example, a particular level of fuel efficiency might be associated with a subclass of fuel-efficient vehicles while another level of fuel efficiency might be associated with a subclass of vehicles that are not considered fuel efficient (which could be, for example, based on some internal classification of vehicles, or a classification associated with a law or regulation).

FIG. 23 provides a similar example for the subgraph 2114 of FIG. 21. Cluster scores for non-instance nodes 1826, 1828, 1838 are calculated as described with respect to FIG. 22, and are summarized in a table 2310. According to the table 2310, having an electric engine is more strongly correlated with class members of the subgraph 2114, while having a particular type of electric engine is not as strongly correlated with class membership.

Example 14—Example Naming of Classes

Once clusters are identified, such as described in Example 13, names can optionally be proposed for the clusters. In one example, instances within, or information about, the cluster can be provided to a large language model, and the large language model can suggest a name. In another example, names/labels for clusters can be determined using techniques described in U.S. Patent Publication No. 2022/0101151, incorporated by reference herein to the extent not inconsistent with the present disclosure.

Example 15—Example User Interface for Review or Modification of Identified Classes A user can be presented with clustering results, including information regarding identified clusters, instances within identified clusters, properties and property values represented in clusters, including ranking information, and proposed cluster names. A user can then choose to accept or modify the class proposals.

Figure 24:
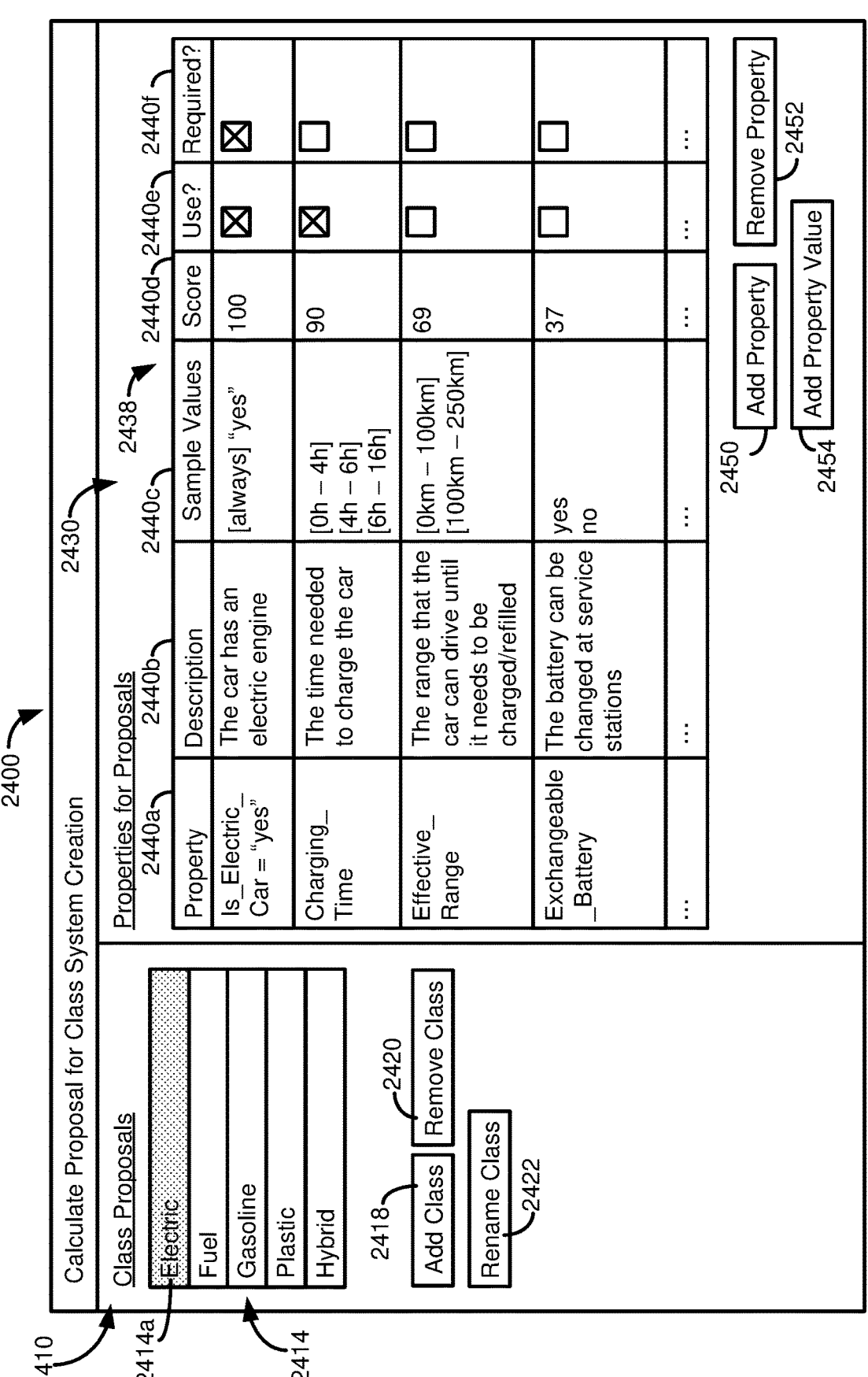
FIG. 24 illustrates an example user interface where a user can view and edit proposed class definitions, such as properties to be included in a class definition, and whether the properties are required for class membership.

FIG. 24 illustrates an example user interface 2400 for presenting a user with class proposals, as well as allowing a user to modify such proposals. A panel 2410 lists classes 2414 identified during graph analysis. The panel 2410 can include a control 2418 to add a class, a control 2420 to remove a class, or a control 2422 to rename a class. Optionally, a user can make other changes to classes, such as adding instances to, or removing instance from, a class.

A panel 2430 provides information regarding properties for a selected class, such as the class 2414a. The property information is presented in a table 2438, having a column 2440*a* identifying the property, a column 2440*b* providing a description of the property, a column 2440*c* providing same values for the property, a column 2440*d* providing a score or ranking (such as how many instances in a graph have the given property), a column 2440*e* that allows users to select a property for use in a class definition, and column 2440*f* that allows users to specify that having a particular property is a requirement for being a member of the class.

In some cases, the properties 2440*a* in the table 2438 can correspond to properties separate from objects/literal values with which the property was concatenated in a materialized graph. Such values can be used to populate the same values in the column 2440*c*.

The panel 2430 can provide a user interface control 2450 to add a property to the class, a control 2452 to remove a property from a class, or a user interface control 2454 to add a property value to the class (such as adding the value as a sample value in the column 2440*c*).

The values in columns 2440*e*, 2440*f* can have a system-provided recommendation. For example, properties that occur in all instances (having a $cs_{cn}$ value of 1) can be suggested as mandatory class properties. Or, properties that satisfy a threshold occurrence frequency can be suggested for use with the class (including even if they do not satisfy a threshold for being recommended as a mandatory property).

Example 16—Example Instance Classification Using Identified Classes

Once one or more classes are defined, instances can be processed to determine additional class members. For example, for an initial set of instances, part of the set can be used to define classes. Once the classes have been defined, the remaining instances in the set can be analyzed using the class definitions and classified into one or more of the classes. Similarly, as new instances are received, they can be classified using the class definitions.

Figure 25:
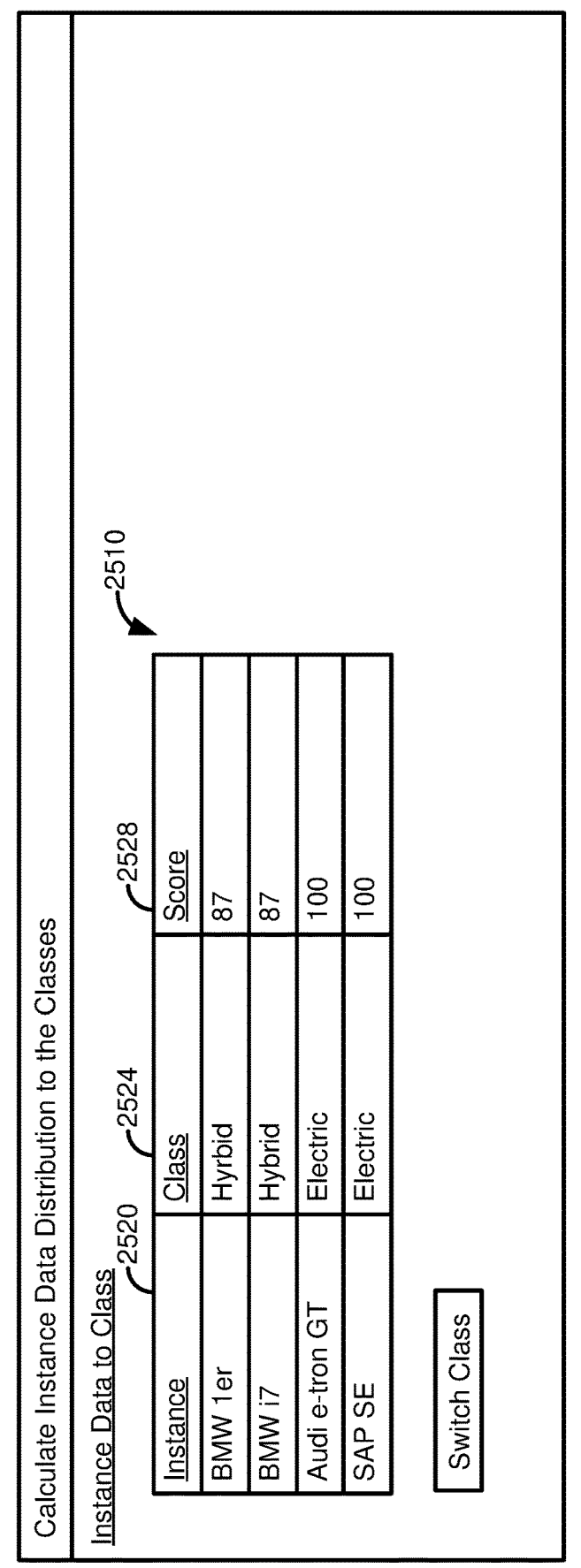
FIG. 25 illustrates an example user interface where a user can review putative assignments of instances to classes.

FIG. 25 present a user interface 2500 that provides classification information to a user. The information is presented in the form of a table 2510, having a column 2520 identifying an instance, a column 2524 identifying a suggested class to be assigned to the instance, a column 2528 providing a score. The score can provide an identification of how well an instance satisfies class criteria. For example, the score can be calculated as a percentage of properties defined for the class that are met by the instance. The score can also take into account particular values associated with a class definition. That is, if an instance has both a property defined for a class and a value that falls within an observed range of for the class, the instance can be given a score that is higher than for an instance that has the property, but whose values are outside of the observed range.

In the table 2500, all of the instances are shown as assigned to a single class. In practice, an instance can be a member of multiple classes, including in situations where an instance is a member of a subclass as well as any super classes of the subclass. In addition, there may be situations where an instance does not satisfy all, or a threshold number, of properties for a class definition. In some cases, a score can be used to determine probabilities of an instance belonging to one or more classes, including by looking at a degree to which an instance belongs to a class (such as a degree to which it complies with class properties/class property values).

Example 17—Example Operations

FIG. 26 is a flowchart of a process 2600 for determining properties to be assigned to an ontology using instance graphs. At 2610, a corpus of documents is received. The corpus of documents represents a plurality of domain instances of a domain. A respective plurality of instance graphs for instances of the plurality of domain instances are generated at 2620, providing a plurality of instance graphs. At 2630, properties represented in the plurality of instance graphs are determined. At least a portion of the properties are assigned to an ontology for the domain at 2640. The ontology is used to execute semantic queries, for automated analytical reasoning, or for machine learning.

FIG. 27 is a flowchart of a process 2700 for generating class definitions for an ontology using instance graphs. A plurality of instance graphs for a respective plurality of domain instances are received at 2710. At 2720, a materialized instance graph is generated from the plurality of instance graphs. One or more communities represented in the materialized instance graph are determined at 2730.

Properties associated with respective communities of the one or more communities are determined at 2740. Class definitions are generated at 2750, where a class corresponds to a community of the one or more communities and at least a portion of properties associated with the community. The class definitions are assigned to an ontology for the domain at 2760. The ontology is used to execute semantic queries, for automated analytical reasoning, or for machine learning.

Example 18—Computing Systems

Figure 28:
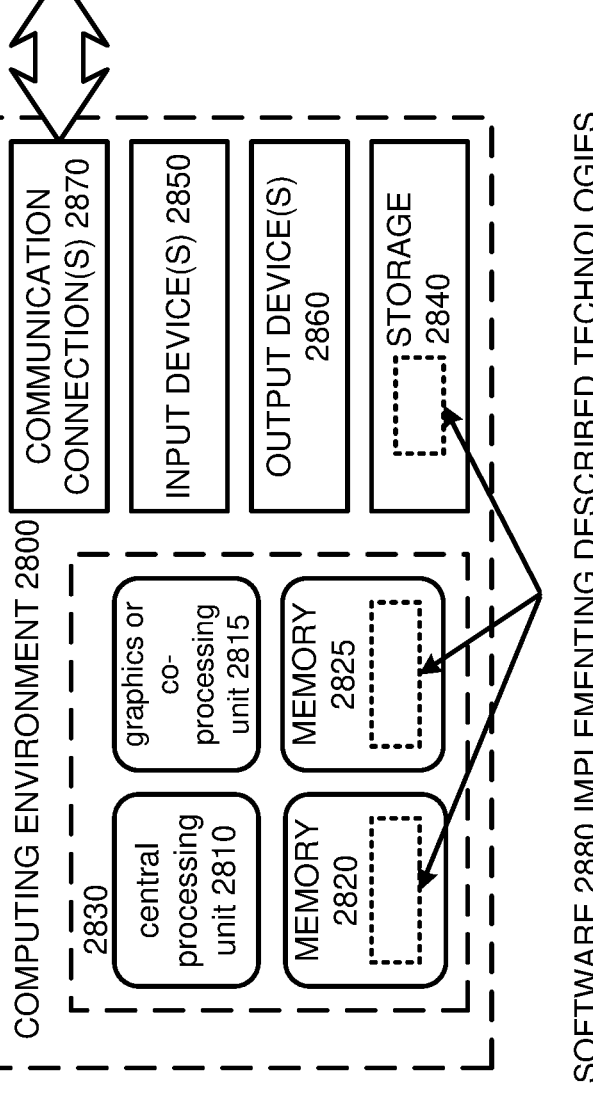
FIG. 28 is a diagram of an example computing system in which some described embodiments can be implemented.

FIG. 28 depicts a generalized example of a suitable computing system 2800 in which the described innovations may be implemented. The computing system 2800 is not intended to suggest any limitation as to scope of use or functionality of the present disclosure, as the innovations may be implemented in diverse general-purpose or special-purpose computing systems.

With reference to FIG. 28, the computing system 2800 includes one or more processing units 2810, 2815 and memory 2820, 2825. In FIG. 28, this basic configuration 2830 is included within a dashed line. The processing units 2810, 2815 execute computer-executable instructions, such as for implementing technologies described in Examples 1-17. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 28 shows a central processing unit 2810 as well as a graphics processing unit or co-processing unit 2815. The tangible memory 2820, 2825 may be volatile memory (e.g., registers, cache, RAM), non-volatile memory (e.g., ROM, EEPROM, flash memory, etc.), or some combination of the two, accessible by the processing unit(s) 2810, 2815. The memory 2820, 2825 stores software 2880 implementing one or more innovations described herein, in the form of computer-executable instructions suitable for execution by the processing unit(s) 2810, 2815.

A computing system 2800 may have additional features. For example, the computing system 2800 includes storage 2840, one or more input devices 2850, one or more output devices 2860, and one or more communication connections 2870. An interconnection mechanism (not shown) such as a bus, controller, or network interconnects the components of the computing system 2800. Typically, operating system software (not shown) provides an operating environment for other software executing in the computing system 2800, and coordinates activities of the components of the computing system 2800.

The tangible storage 2840 may be removable or non-removable, and includes magnetic disks, magnetic tapes or cassettes, CD-ROMs, DVDs, or any other medium which can be used to store information in a non-transitory way, and which can be accessed within the computing system 2800. The storage 2840 stores instructions for the software 2880 implementing one or more innovations described herein.

The input device(s) 2850 may be a touch input device such as a keyboard, mouse, pen, or trackball, a voice input device, a scanning device, or another device that provides input to the computing system 2800. The output device(s) 2860 may be a display, printer, speaker, CD-writer, or another device that provides output from the computing system 2800.

The communication connection(s) 2870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

*Example 19—Cloud Computing Environment*

Figure 29:
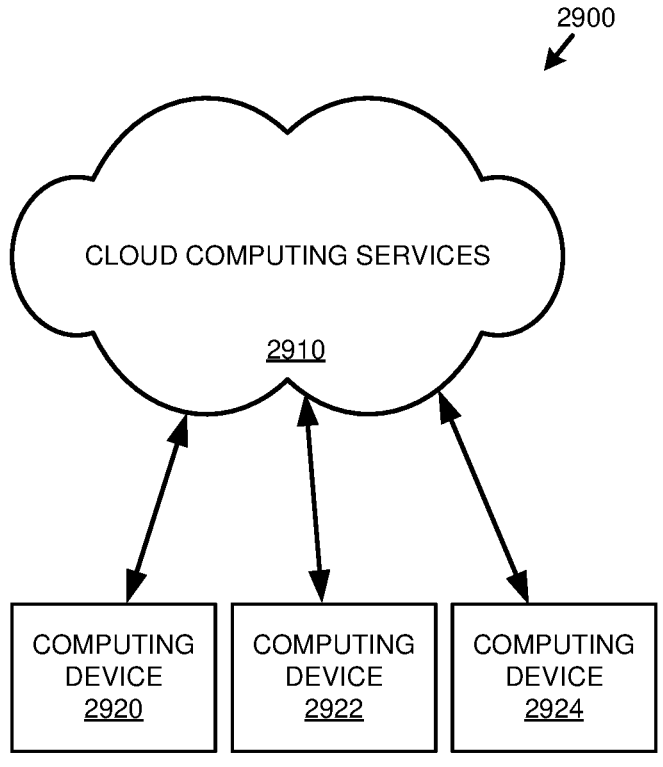
FIG. 29 is an example cloud computing environment that can be used in conjunction with the technologies described herein.

FIG. 29 depicts an example cloud computing environment 2900 in which the described technologies can be implemented. The cloud computing environment 2900 comprises cloud computing services 2910. The cloud computing services 2910 can comprise various types of cloud computing resources, such as computer servers, data storage repositories, networking resources, etc. The cloud computing services 2910 can be centrally located (e.g., provided by a data center of a business or organization) or distributed (e.g., provided by various computing resources located at different locations, such as different data centers and/or located in different cities or countries).

The cloud computing services 2910 are utilized by various types of computing devices (e.g., client computing devices), such as computing devices 2920, 2922, and 2924. For example, the computing devices (e.g., 2920, 2922, and 2924) can be computers (e.g., desktop or laptop computers), mobile devices (e.g., tablet computers or smart phones), or other types of computing devices. For example, the computing devices (e.g., 2920, 2922, and 2924) can utilize the cloud computing services 2910 to perform computing operators (e.g., data processing, data storage, and the like).

*Example 20—Implementations*

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 28, computer-readable storage media include memory 2820 and 2825, and storage 2840. The term computer-readable storage media does not include signals and carrier waves. In addition, the term computer-readable storage media does not include communication connections (e.g., 2870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, R, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one memory;
one or more hardware processing units coupled to the at least one memory; and
one or more computer readable storage media storing computer-executable instructions that, when executed, cause the computing system to perform operations comprising:
receiving a plurality of instance graphs for a respective plurality of domain instances, each instance graph comprising nodes corresponding to property-value pairs and edges representing associations among those property-value pairs for, and associated with, the corresponding domain instance;

generating a materialized instance graph by transforming nodes and property relationships of the plurality of instance graphs, wherein the materialized instance graph aggregates nodes and edges derived from multiple ones of the plurality of instance graphs as a property-encoded graph having unlabeled edges connecting nodes that each represent a property-literal pair encoded together to identify both a property and its corresponding literal value, including shared property-literal nodes corresponding to common property-value pairs across the domain instances, the materialized instance graph comprising at least one hundred nodes;

determining, using a graph-clustering or community-detection algorithm, one or more communities represented in the materialized instance graph, each community comprising property-literal nodes that co-occur across multiple domain instances;

determining, for each of the one or more communities, properties associated with nodes of the respective communities of the one or more communities based on connectivity of property-literal nodes within the materialized instance graph, each property-literal node being labeled with a property identifier and a corresponding literal value;

generating class definitions, where a class corresponds to a community of the one or more communities and each class definition comprises at least a portion of the properties associated with that community; and assigning the class definitions to an ontology for the domain;

wherein the ontology is used to execute semantic queries, for automated analytical reasoning, or for machine learning.

2. The computing system of claim 1, wherein the encoding comprises a concatenation of a property in one or more of the plurality of instance graphs and a literal associated with the property.

3. The computing system of claim 1, wherein determining one or more communities represented in the materialized instance graph comprises removing one or more nodes of the materialized instance graph to provide a plurality of subgraphs, wherein at least a portion of the subgraphs correspond to communities.

4. The computing system of claim 3, wherein removing one or more nodes comprises removing nodes satisfying a betweenness threshold.

5. The computing system of claim 1, the operations further comprising:
determining cluster scores for properties in at least one respective community of the plurality of communities.

6. The computing system of claim 5, the operations further comprising:
based at least in part on the cluster scores, determining properties to be recommended for inclusion in a class definition corresponding to the at least one respective community; and
rendering a user interface displaying at least a portion of the properties determined for the at least one respective community and identifying properties of the at least a portion of the properties that are recommended for inclusion in the class definition.

7. The computing system of claim 5, the operations further comprising:

based at least in part on the cluster scores, determining properties to be recommended as requirements in a class definition corresponding to the at least one respective community; and rendering a user interface displaying at least a portion of the properties determined for the at least one respective community and identifying properties of the at least a portion of the properties that are recommended as requirements for the class definition.

8. The computing system of claim 1, the operations further comprising:

rendering a user interface; and through the user interface, receiving one or more class definition parameters, the one or more class definition parameters comprising an indication of a number of classes to be identified in the determining one or more communities.

9. The computing system of claim 8, wherein the number of classes is specified as one or more of a maximum number of classes or a minimum number of classes.

10. The computing system of claim 1, the operations further comprising:

rendering a user interface; and through the user interface, receiving one or more class definition parameters, the one or more class definition parameters comprising an indication of a number of properties to be identified for communities of the one or more communities.

11. The computing system of claim 10, wherein the number of properties is specified as one or more of a maximum number of properties or a minimum number of properties.

12. The computing system of claim 1, the operations further comprising:

analyzing at least a portion of the materialized instance graph corresponding to a class definition;

determining a proposed name for the class definition based at least in part on the analyzing; and rending a user interface displaying the proposed name for the class definition.

13. The computing system of claim 1, wherein the determining one or more communities comprises determining at least one community and at least another community that is a subcommunity of the at least one community.

14. The computing system of claim 1, the operations further comprising:

receiving an instance graph that is not in the plurality of instance graphs; and classifying a domain instance represented in the instance graph according to the class definitions.

15. A method, implemented in a computing system comprising at least one hardware processor and at least one memory coupled to the at least one hardware processor, the method comprising:

receiving a plurality of instance graphs for a respective plurality of domain instances, each instance graph comprising nodes corresponding to property-value pairs and edges representing associations among those property-value pairs for, and associated with, the corresponding domain instance;

generating a materialized instance graph by transforming nodes and property relationships of the plurality of instance graphs, wherein the materialized instance graph aggregates nodes and edges derived from multiple ones of the plurality of instance graphs as a property-encoded graph having unlabeled edges connecting nodes that each represent a property-literal pair encoded together to identify both a property and its corresponding literal value, including shared property-literal nodes corresponding to common property-value pairs across the domain instances, the materialized instance graph comprising at least one hundred nodes;

determining, using a graph-clustering or community-detection algorithm, one or more communities represented in the materialized instance graph;

determining, for each of the one or more communities, properties associated with nodes of the properties associated with respective communities of the one or more communities based on connectivity of property-literal nodes within the materialized instance graph, each property-literal node being labeled with a property identifier and a corresponding literal value;

generating class definitions, where a class corresponds to a community of the one or more communities and each class definition comprises at least a portion of the properties associated with that community; and assigning the class definitions to an ontology for the domain;

wherein the ontology is used to execute semantic queries, for automated analytical reasoning, or for machine learning.

16. The method of claim 15, wherein the materialized instance graph represents edges of the plurality of instance graphs as nodes in the materialized instance graph and at least portion of the nodes represent properties in the plurality of instance graphs, the method further comprising:

removing one or more nodes of the materialized instance graph to provide a plurality of subgraphs, wherein at least a portion of the subgraphs correspond to communities;

determining cluster scores for properties in at least one respective community of the plurality of communities;

based at least in part on the cluster scores, determining properties to be recommended for inclusion in a class definition corresponding to the at least one respective community; and rendering a user interface displaying at least a portion of the properties determined for the at least one respective community and identifying properties of the at least a portion of the properties that are recommended for inclusion in the class definition.

17. One or more computer-readable storage media comprising:

computer-executable instructions that, when executed by a computing system comprising at least one hardware processor and at least one memory coupled to the at least on hardware processor, cause the computing system to receive a plurality of instance graphs for a respective plurality of domain instances, each instance graph comprising nodes corresponding to property-value pairs and edges representing associations among those property-value pairs for, and associated with, the corresponding domain instance;

computer-executable instructions that, when executed by the computing system, cause the computing system to generate a materialized instance graph by transforming nodes and property relationships of the plurality of instance graphs, wherein the materialized instance graph aggregates nodes and edges derived from multiple ones of the plurality of instance graphs as a property-encoded graph having unlabeled edges connecting nodes that each represent a property-literal pair encoded together to identify both a property and its corresponding literal value, including shared property-literal nodes corresponding to common property-value pairs across the domain instances, the materialized instance graph comprising at least one hundred nodes;

computer-executable instructions that, when executed by the computing system, cause the computing system to determine, using a graph-clustering or community-detection algorithm, one or more communities represented in the materialized instance graph, each community comprising property-literal nodes that co-occur across multiple domain instances;

computer-executable instructions that, when executed by the computing system, cause the computing system to determine, for each of the one or more communities, properties associated with nodes of respective communities of the one or more communities based on connectivity of property-literal nodes within the materialized instance graph, each property-literal node being labeled with a property identifier and a corresponding literal value;

computer-executable instructions that, when executed by the computing system, cause the computing system to generate class definitions, where a class corresponds to a community of the one or more communities and each class definition comprises at least a portion of the properties associated with the community; and computer-executable instructions that, when executed by the computing system, cause the computing system to assign the class definitions to an ontology for the domain, wherein the ontology is used to execute semantic queries, for automated analytical reasoning, or for machine learning.

18. The one or more computer-readable storage media of claim 17, wherein at least a portion of the instance graphs use different terminology for properties represented in the instance graphs, further comprising:

computer-executable instructions that, when executed by the computing system, cause the computing system to remove one or more nodes of the materialized instance graph to provide a plurality of subgraphs, wherein at least a portion of the subgraphs correspond to communities;

computer-executable instructions that, when executed by the computing system, cause the computing system to determine cluster scores for properties in at least one respective community of the plurality of communities;

computer-executable instructions that, when executed by the computing system, cause the computing system to, based at least in part on the cluster scores, determine properties to be recommended for inclusion in a class definition corresponding to the at least one respective community; and computer-executable instructions that, when executed by the computing system, cause the computing system to render a user interface displaying at least a portion of the properties determined for the at least one respective community and identifying properties of the at least a portion of the properties that are recommended for inclusion in the class definition.

19. The one or more computer-readable storage media of claim 17, further comprising:

computer-executable instructions that, when executed by the computing system, cause the computing system to receive an instance graph that is not in the plurality of instance graphs; and computer-executable instructions that, when executed by the computing system, cause the computing system to classify a domain instance represented in the instance graph according to the class definitions.

20. The method of claim 15, further comprising:

receiving an instance graph that is not in the plurality of instance graphs; and classifying a domain instance represented in the instance graph according to the class definitions.

* * * * *